US 7,954,968 B2

(12) United States Patent
Takata et al.

(10) Patent No.: US 7,954,968 B2
(45) Date of Patent: Jun. 7, 2011

(54) BACKLIGHT MODULE, BACKLIGHT MODULE MANUFACTURING METHOD, LIGHTING DEVICE, DISPLAY DEVICE AND TELEVISION RECEIVER

(75) Inventors: Yoshiki Takata, Suzuka (JP); Kenichi Iwamoto, Kobe (JP); Takaaki Kudo, Shibuya-ku (JP); Naofumi Ikenaga, Shibuya-ku (JP)

(73) Assignees: Sharp Kabushiki Kaisha, Osaka (JP); Japan Aviation Electronics Industry, Limited, Tokyo (JP)

( * ) Notice: Subject to any disclaimer, the term of this patent is extended or adjusted under 35 U.S.C. 154(b) by 186 days.

(21) Appl. No.: 12/305,372

(22) PCT Filed: May 24, 2007

(86) PCT No.: PCT/JP2007/060627
§ 371 (c)(1),
(2), (4) Date: Dec. 18, 2008

(87) PCT Pub. No.: WO2008/001563
PCT Pub. Date: Jan. 3, 2008

(65) Prior Publication Data
US 2009/0201666 A1    Aug. 13, 2009

(30) Foreign Application Priority Data

Jun. 30, 2006  (JP) .................................. 2006-181841
Jan. 30, 2007  (JP) .................................. 2007-019874

(51) Int. Cl.
*G09F 13/04* (2006.01)

(52) U.S. Cl. .................... 362/97.1; 362/97.4; 362/581
(58) Field of Classification Search .............. 362/581, 362/97.1, 97.2, 97.3, 97.4; 439/733.1
See application file for complete search history.

(56) References Cited

U.S. PATENT DOCUMENTS

| 7,325,941 | B2* | 2/2008 | Kim et al. ............... 362/225 |
| 7,452,102 | B2* | 11/2008 | Ryu ........................ 362/225 |
| 7,530,703 | B2* | 5/2009 | Ryu ........................ 362/29 |
| 2002/0149713 | A1* | 10/2002 | Ishida et al. ................ 349/58 |
| 2003/0071933 | A1 | 4/2003 | Ohta et al. |
| 2005/0226002 | A1 | 10/2005 | Aoki et al. |

(Continued)

FOREIGN PATENT DOCUMENTS

EP        1 762 886 A1     3/2007

(Continued)

OTHER PUBLICATIONS

Official Communication issued in International Patent Application No. PCT/JP2007/060627, mailed on Jun. 19, 2007.

(Continued)

*Primary Examiner* — Diane I Lee
*Assistant Examiner* — Evan Dzierzynski
(74) *Attorney, Agent, or Firm* — Keating & Bennett, LLP

(57) ABSTRACT

In a backlight module, when relay connectors exposed to a back side of a chassis are engaged with the connector portions of a lighting jig, the power from the power supply source of the lighting jig is supplied to discharge tubes via the connector portions and the relay connectors. Thereby, the discharge tubes can be lighted, even if a power board is not connected to the relay connectors. At the time, the lighting jig is arranged to face the back surface of the chassis, and therefore optical sheets can be mounted to the chassis from the front side.

9 Claims, 32 Drawing Sheets

U.S. PATENT DOCUMENTS

2007/0058376 A1  3/2007  Suzuki

FOREIGN PATENT DOCUMENTS

JP  2004-294592 A  10/2004

OTHER PUBLICATIONS

Takata et al.; "Relay Connector, Mounting Structure of Relay Connector and Chassis, and Mounting Structure of Relay Connector and Discharge Tube"; U.S. Appl. No. 12/305,373, filed Dec. 18, 2008.

Takata et al.; "Discharge Tube, Ferrule, Lighting Device, Display Device and Television Receiver"; U.S. Appl. No. 12/305,374, filed Dec. 18, 2008.

Takata et al.; "Power Board, On-Board Connector, Lighting Device, Display Device and Television Receiver"; U.S. Appl. No. 12/305,377, filed Dec. 18, 2008.

Takata et al.; "Power Board, On-Board Connector, Lighting Device, Display Device and Television Receiver"; U.S. Appl. No. 12/305,378, filed Dec. 18, 2008.

Takata et al.; "Discharge Tube, Ferrule, Lighting Device, Display Device and Television Receiver"; U.S. Appl. No. 12/305,371, filed Dec. 18, 2008.

Takata et al., "Discharge Tube, Ferrule, Lighting Device, Display Device and Television Receiver," U.S. Appl. No. 12/768,896, filed Apr. 28, 2010.

Takata et al., "Relay Connector, Mounting Structure of Relay Connector and Chassis, and Mounting Structure of Relay Connector and Discharge Tube," U.S. Appl. No. 12/768,932, filed Apr. 28, 2010.

Takata et al., "Discharge Tube, Ferrule, Lighting Device, Display Device and Television Receiver," U.S. Appl. No. 12/642,194, filed Dec. 18, 2009.

Takata et al., "Discharge Tube, Ferrule, Lighting Device, Display Device and Television Receiver," U.S. Appl. No. 12/642,043, filed Dec. 18, 2009.

Takata et al., "Relay Connector, Mounting Structure of Relay Connector and Chassis, and Mounting Structure of Relay Connector and Discharge Tube," U.S. Appl. No. 12/642,297, filed Dec. 18, 2009.

Takata et al., "Discharge Tube, Ferrule, Lighting Device, Display Device and Television Receiver," U.S. Appl. No. 12/645,738, filed Dec. 23, 2009.

Takata et al.: "Discharge Tube, Ferrule, Lighting Device, Display Device and Television Receiver," U.S. Appl. No. 12/358,303, filed Jan. 23, 2009.

* cited by examiner

FIG.9
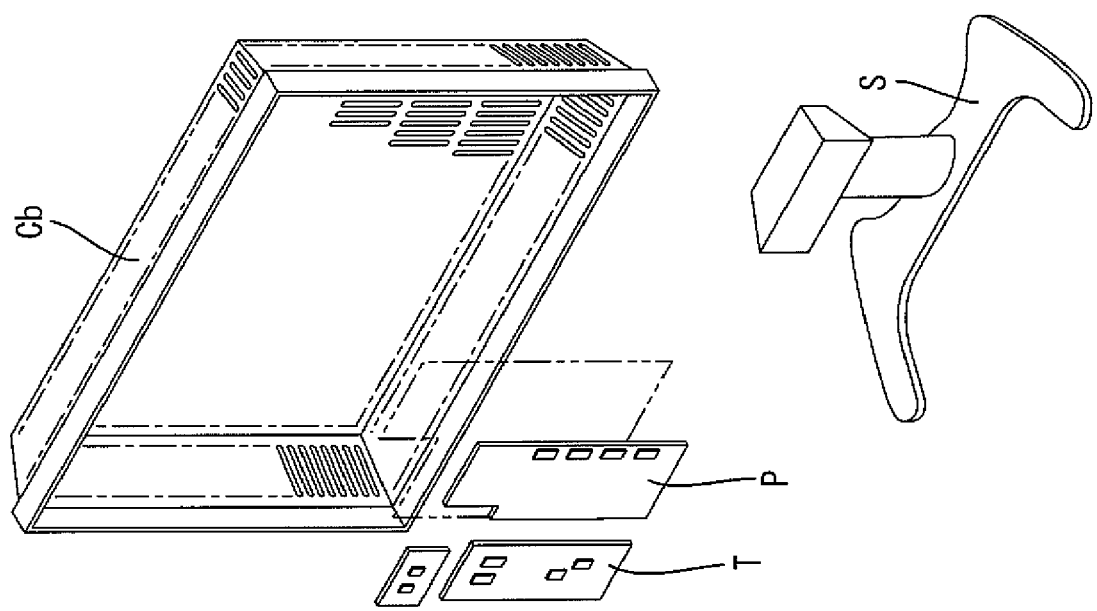
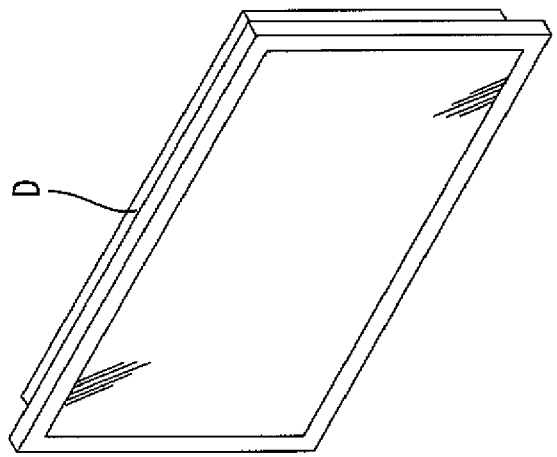
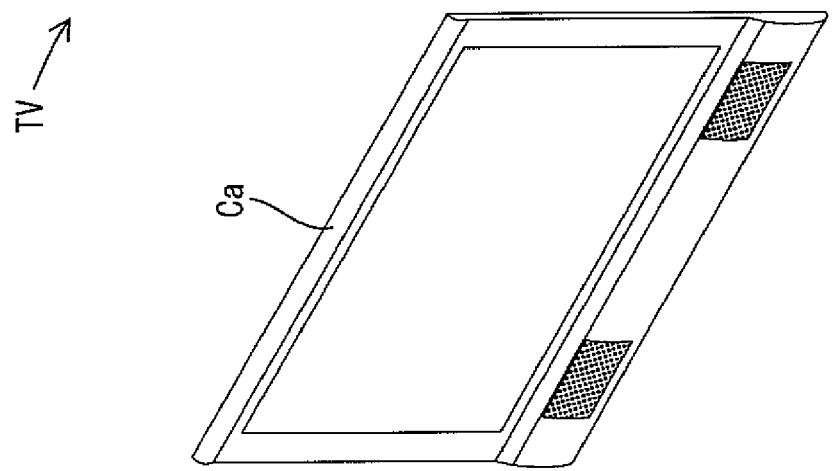

BACKLIGHT MODULE, BACKLIGHT MODULE MANUFACTURING METHOD, LIGHTING DEVICE, DISPLAY DEVICE AND TELEVISION RECEIVER

BACKGROUND OF THE INVENTION

1. Field of the Invention

The present invention relates to a backlight module, a backlight module manufacturing method, a lighting device, a display device and a television receiver.

2. Description of the Related Art

An example of a lighting device capable of functioning as a backlight for a liquid crystal display device is disclosed in JP-A-2004-294592. The lighting device has a construction in which discharge tubes are arranged on the front side of a substantially flat plate-shaped chassis while power boards are arranged on the back side of the chassis. The power from the power boards can be supplied to the discharge tubes via relay brackets mounted to the chassis.

In the lighting device, optical sheets are mounted to the chassis from the front side so as to cover the discharge tubes. During the process of mounting the optical sheets, an inspection of the optical sheets is concurrently performed. That is, at the time of mounting, the surfaces of the optical sheets are visually checked in order to detect a faulty optical sheet, and dust elimination is performed, if necessary.

When the optical sheets are thus inspected, the discharge tubes are preferably lighted in order to improve inspection accuracy. The power supply from the power boards mounted to the chassis can be provided to light the discharge tubes.

In a manufacturing process of a lighting device, the partially-finished assembly may be transported to another assembly plant when the assembling is partially finished, so that the assembling is continued at the destination plant. The following case can be assumed as an example of assembling thus performed. A backlight module, in which discharge tubes, relay terminals and optical sheets are attached to a chassis but power boards are not attached to the chassis, is assembled and transported to another assembly plant.

However, during the assembly of this form of backlight module, the power supply from power boards to the discharge tubes is impossible, and therefore the mounting of the optical sheets must be performed with the unlighted discharge tubes. Thereby, the accuracy in inspection of the optical sheets may be deteriorated.

SUMMARY OF THE INVENTION

In view of the foregoing circumstances, preferred embodiments of the present invention were developed to enable mounting of optical sheets to be performed with lighted discharge tubes without mounting a power board.

A backlight module according to a preferred embodiment of the present invention includes a chassis having a substantially plate-shaped configuration, a relay connector mounted to the chassis, a discharge tube arranged on the front side of the chassis and connected to the relay connector, and an optical member mounted to the chassis from the front side so as to cover the discharge tube. A lighting device, to be used in a display device for illuminating a display panel from a back side, can be formed by connecting a power board to the relay connector. The relay connector is arranged to be exposed to the back side of the chassis, and a connecting portion provided on the relay connector for connection to the power board is capable of conductive engagement with a connector portion of a lighting jig that includes a power supply source and the connector portion connected to the power supply source.

According to a preferred embodiment of the present invention, the power from the power supply source of the lighting jig is supplied to the discharge tube via the connector portion and the relay connector, when the relay connector exposed to the back side of the chassis is engaged with the connector portion of the lighting jig. Thereby, the discharge tube can be lighted, even if the power board is not connected to the relay connector. At the time, the lighting jig is arranged to face the back surface of the chassis, and therefore the optical member can be mounted to the chassis from the front side.

In the backlight module according to a preferred embodiment of the present invention described above, each of the mounting direction of the discharge tube to the relay connector and the mounting direction of the power board to the relay connector can be set to be substantially perpendicular to the surface of the chassis.

In this case, the discharge tube and the power board can be mounted to the chassis so as to define a stack structure, because each of the mounting direction of the discharge tube to the relay connector and the mounting direction of the power board to the relay connector preferably is set to be substantially perpendicular to the surface of the chassis.

A backlight module manufacturing method according to another preferred embodiment of the present invention is provided for manufacturing a backlight module that includes a chassis having a substantially plate-shaped configuration, a relay connector mounted to the chassis, a discharge tube arranged on the front side of the chassis and connected to the relay connector, and an optical member mounted to the chassis from the front side so as to cover the discharge tube. A lighting device, to be used in a display device for illuminating a display panel from the back side, can be formed by connecting a power board to the relay connector. In a state of the relay connector being arranged to be exposed to the back side of the chassis and a connecting portion for connection to the power board being provided on the relay connector so as to be capable of conductive connection to a connector portion of a lighting jig that includes a power supply source and the connector portion connected to the power supply source, the backlight module manufacturing method includes engaging the relay connector, disconnected from the power board, with the connector portion so as to light the discharge tube connected to the relay connector, and further includes mounting the optical member to the chassis while the discharge tube is lighted.

According to a preferred embodiment of the present invention, the power from the power supply source of the lighting jig is supplied to the discharge tube via the connector portion and the relay connector, when the relay connector exposed to the back side of the chassis is engaged with the connector portion of the lighting jig. Thereby, the discharge tube can be lighted, even if the power board is not connected to the relay connector. At the time, the lighting jig is arranged to face the back surface of the chassis, and therefore the optical member can be mounted to the chassis from the front side.

In the backlight module manufacturing method according to a preferred embodiment of the present invention described above, each of the mounting direction of the discharge tube to the relay connector and the mounting direction of the power board to the relay connector can be set to be substantially perpendicular to the surface of the chassis.

In this case, the discharge tube and the power board can be mounted to the chassis so as to define a stack structure, because each of the mounting direction of the discharge tube to the relay connector and the mounting direction of the power board to the relay connector is set to be substantially perpendicular to the surface of the chassis.

A lamp unit according to a preferred embodiment of the present invention includes a chassis having a substantially plate-shaped configuration, a relay connector mounted to the chassis, and a discharge tube arranged on the front side of the chassis and connected to the relay connector. A lighting device, to be used in a display device for illuminating a display panel from the back side, can be formed by mounting an optical member to the chassis from the front side so as to cover the discharge tube and connecting a power board to the relay connector. The relay connector is arranged to be exposed to the back side of the chassis, and a connecting portion for connection to the power board is provided on the relay connector so as to be capable of conductive engagement with a connector portion of a lighting jig that includes a power supply source and the connector portion connected to the power supply source.

According to various preferred embodiments of the present invention, the power from the power supply source of the lighting jig is supplied to the discharge tube via the connector portion and the relay connector, when the relay connector exposed to the back side of the chassis is engaged with the connector portion of the lighting jig. Thereby, the discharge tube can be lighted, even if the power board is not connected to the relay connector. At the time, the lighting jig is arranged to face the back surface of the chassis, and therefore the optical member can be mounted to the chassis from the front side.

In the lamp unit according to a preferred embodiment of the present invention described above, each of the mounting direction of the discharge tube to the relay connector and the mounting direction of the power board to the relay connector can be set to be substantially perpendicular to the surface of the chassis.

In this case, the discharge tube and the power board can be mounted to the chassis so as to define a stack structure, because each of the mounting direction of the discharge tube to the relay connector and the mounting direction of the power board to the relay connector is set to be substantially perpendicular to the surface of the chassis.

A lighting jig according to a preferred embodiment of the present invention is used in manufacture of a backlight module that includes a chassis having a substantially plate-shaped configuration, a relay connector mounted to the chassis so as to be exposed to the front side and the back side thereof, a discharge tube arranged on the front side of the chassis and connected to the relay connector, and an optical member mounted to the chassis from the front side so as to cover the discharge tube. A lighting device, to be used in a display device for illuminating a display panel from the back side, can be formed by connecting a power board to the relay connector. The lighting jig includes a power supply source, and a connector portion connected to the power supply source. The connector portion is capable of conductive engagement with a connecting portion that is provided on the relay connector for connection to the power board. The power from the power supply source is supplied to the discharge tube connected to the relay connector, when the relay connector disconnected from the power board is engaged with the connector portion.

According to a preferred embodiment of the present invention, the power from the power supply source of the lighting jig is supplied to the discharge tube via the connector portion and the relay connector, when the relay connector exposed to the back side of the chassis is engaged with the connector portion of the lighting jig. Thereby, the discharge tube can be lighted, even if the power board is not connected to the relay connector. At the time, the lighting jig is arranged to face the back surface of the chassis, and therefore the optical member can be mounted to the chassis from the front side.

In the lighting jig according to a preferred embodiment of the present invention described above, the engaging direction of the connector portion with the relay connector can be set to be parallel or substantially parallel to the mounting direction of the discharge tube to the relay connector and to be substantially perpendicular to the surface of the chassis.

In this case, the discharge tube and the power board can be mounted to the chassis so as to define a stack structure, because each of the mounting direction of the discharge tube to the relay connector and the mounting direction of the power board to the relay connector is set to be substantially perpendicular to the surface of the chassis.

A lighting device according to a preferred embodiment of the present invention includes a backlight module according to a preferred embodiment of the present invention described above, and a power board connected to a relay connector included in the backlight module.

A display device according to a preferred embodiment of the present invention includes a lighting device according to a preferred embodiment of the present invention described above, and a display panel arranged on the front side of the lighting device.

A television receiver according to a preferred embodiment of the present invention includes a display device according to another preferred embodiment of the present invention described above.

These and other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 9 is an exploded perspective view of a television receiver.

DETAILED DESCRIPTION OF THE PREFERRED EMBODIMENTS

Preferred Embodiment 1

Figure 1:
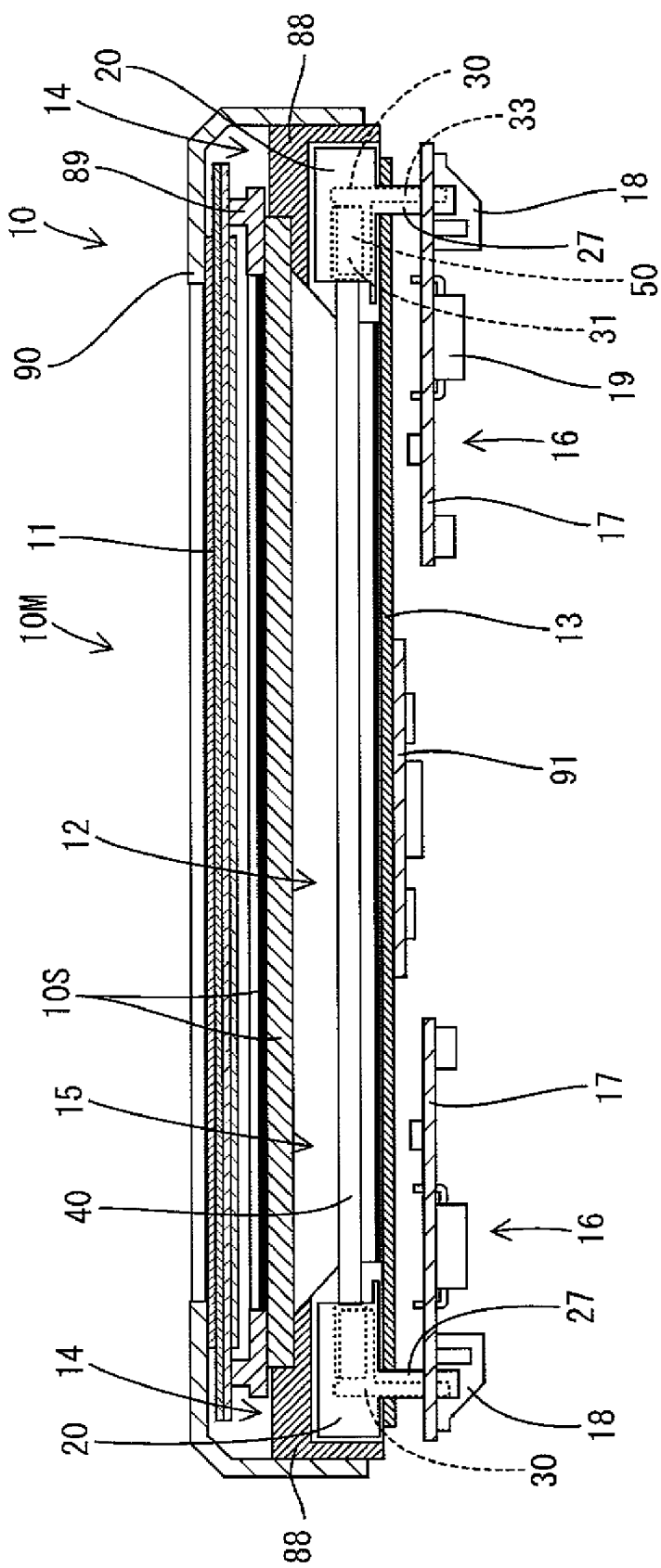
FIG. 1 is a horizontal sectional view of a display device according to preferred embodiment 1 of the present invention.

Preferred embodiment 1 according to the present invention will be hereinafter explained with reference to FIGS. 1 to 9.
Overview of Display Device D and Lighting Device 10

A display device D used in a television receiver TV shown in FIG. 9 is a so-called liquid crystal display device, which preferably has a substantially horizontally-elongated rectangular shape and includes a display panel 11 and a lighting device 10. The display panel 11 is disposed on the front side of the lighting device 10, so that the lighting device 10 as a backlight can illuminate the display panel 11 from the back side. As shown in FIG. 9, the television receiver includes the display device D, and front and back cabinets Ca and Cb capable of holding the display device D therebetween. Further included are a power source P other than a power board 16 described below, a tuner T and a stand S.

The display panel 11 has a well-known construction, in which liquid crystal as a material with an optical property that changes with applied voltage is disposed in the gap between a transparent TFT substrate and a transparent CF substrate. TFTs (Thin Film Transistors), as switching elements connected to a source wiring line and a gate wiring line running at right angles to each other, and pixel electrodes connected to the TFTs are provided on the TFT substrate. A color filter, on which color sections of three primary colors, i.e., Red (R), Green (G) and Blue (B), are arranged in a matrix, and a common electrode are provided on the CF substrate.

The lighting device 10 includes a backlight module 10M and power boards 16.
Overview of Backlight Module 10M

As shown in FIG. 1, the backlight module 10M includes a lamp unit 12 and a plurality of sheet-shaped or plate-shaped optical sheets 10S.

Figure 2:
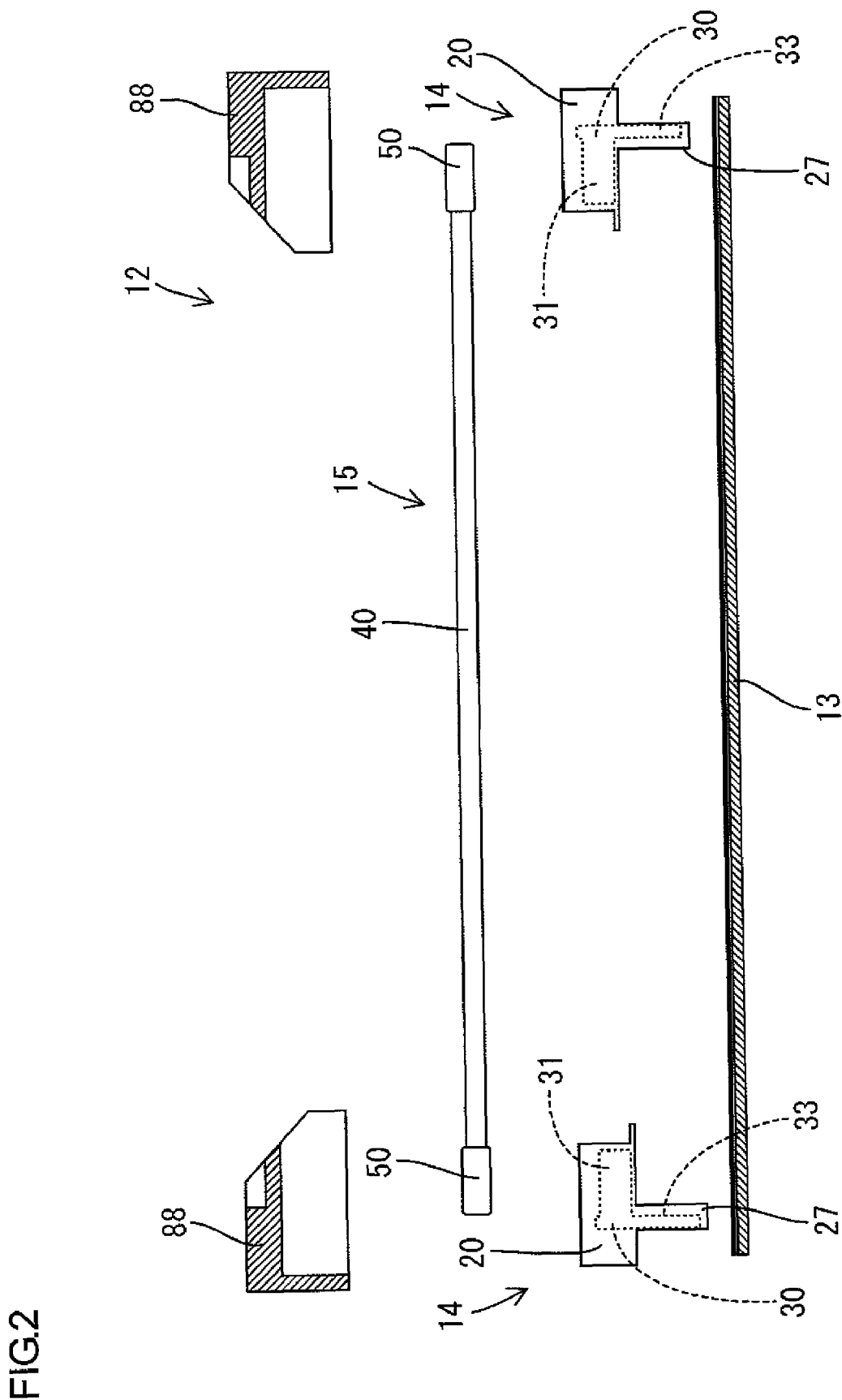
FIG. 2 is a sectional view showing a lamp unit in an unassembled state.
Figure 3:
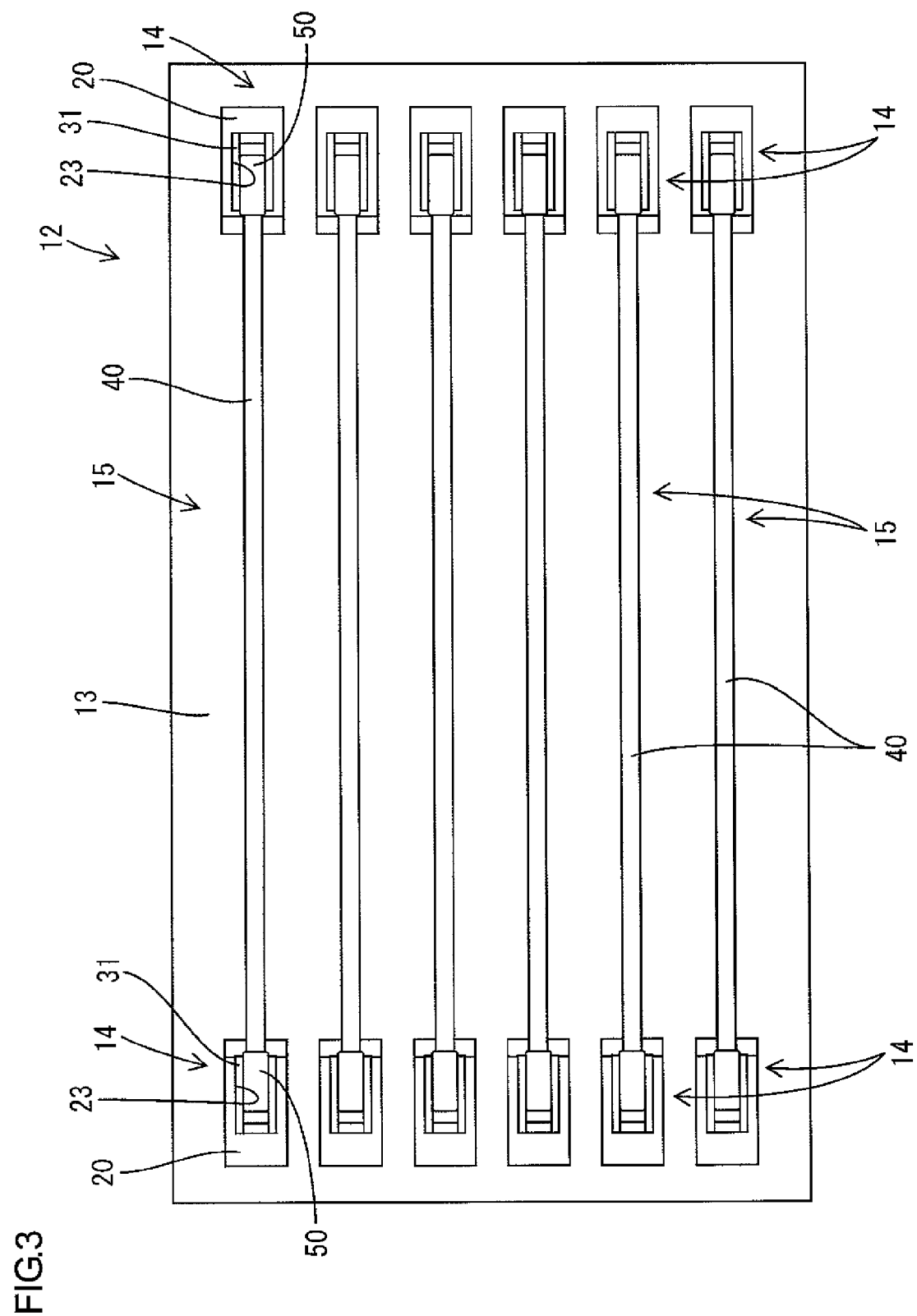
FIG. 3 is a front view of the lamp unit.
Figure 4:
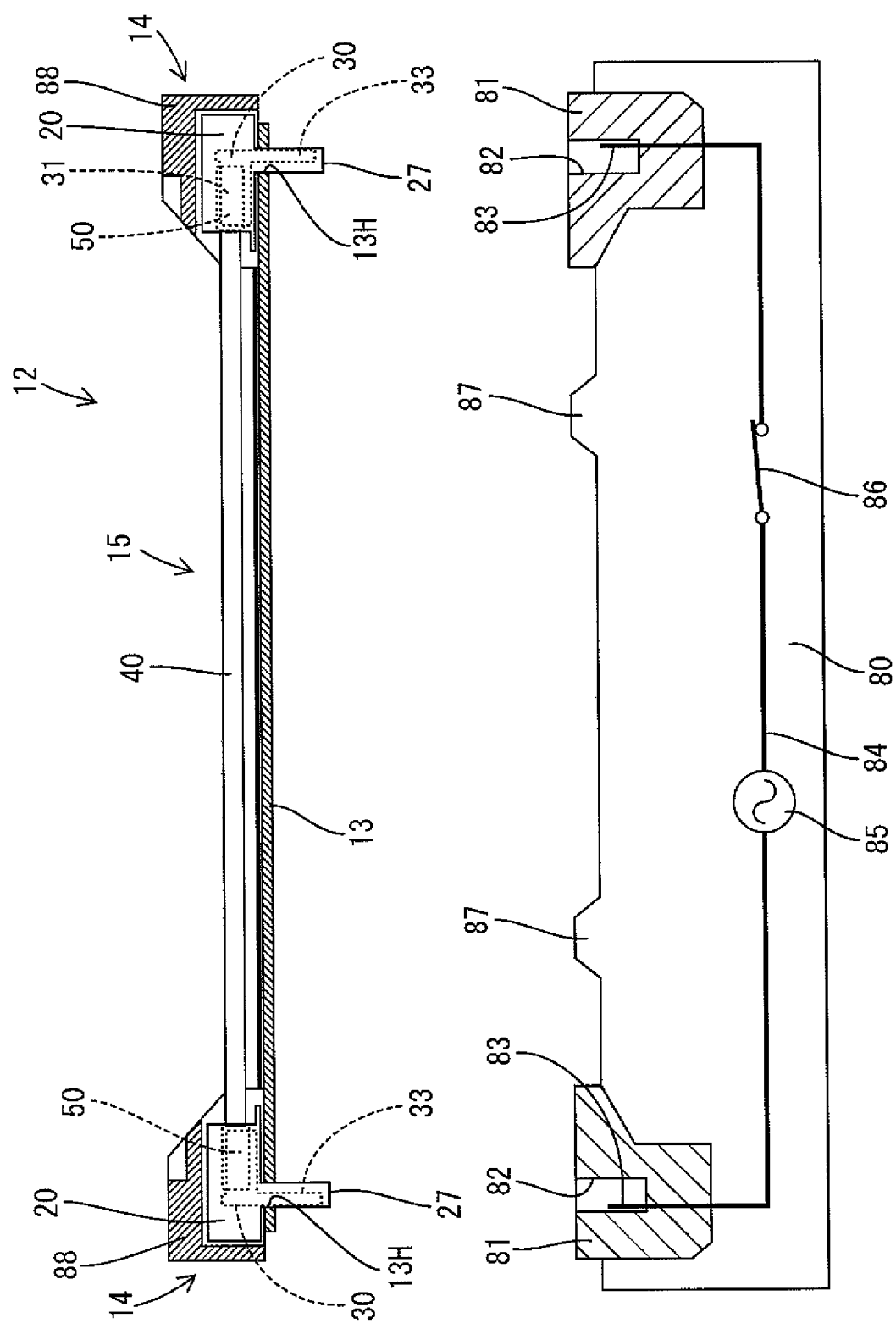
FIG. 4 is a sectional view showing the lamp unit before being attached to a lighting jig.
Figure 5:
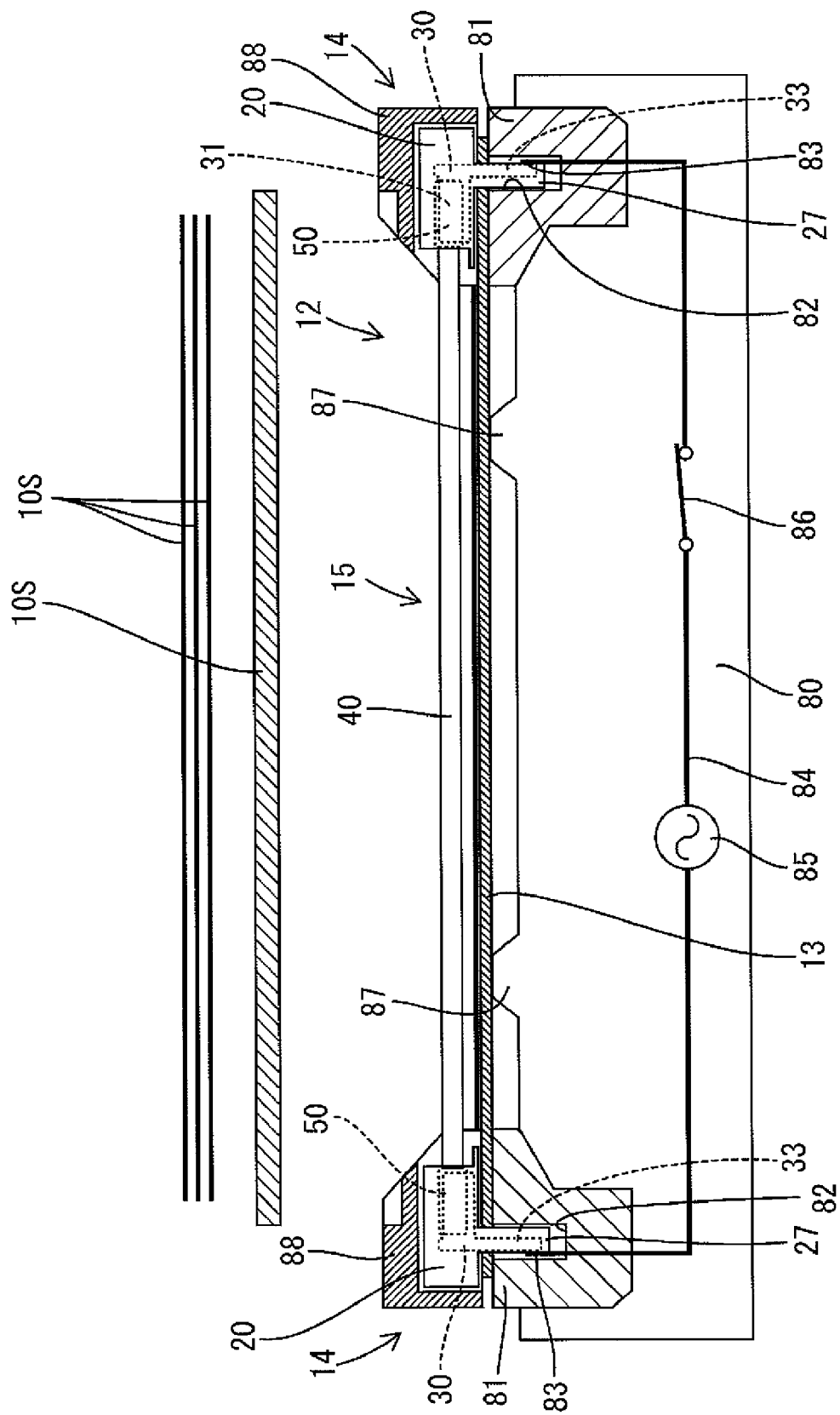
FIG. 5 is a sectional view showing the lamp unit attached to the lighting jig.
Figure 6:
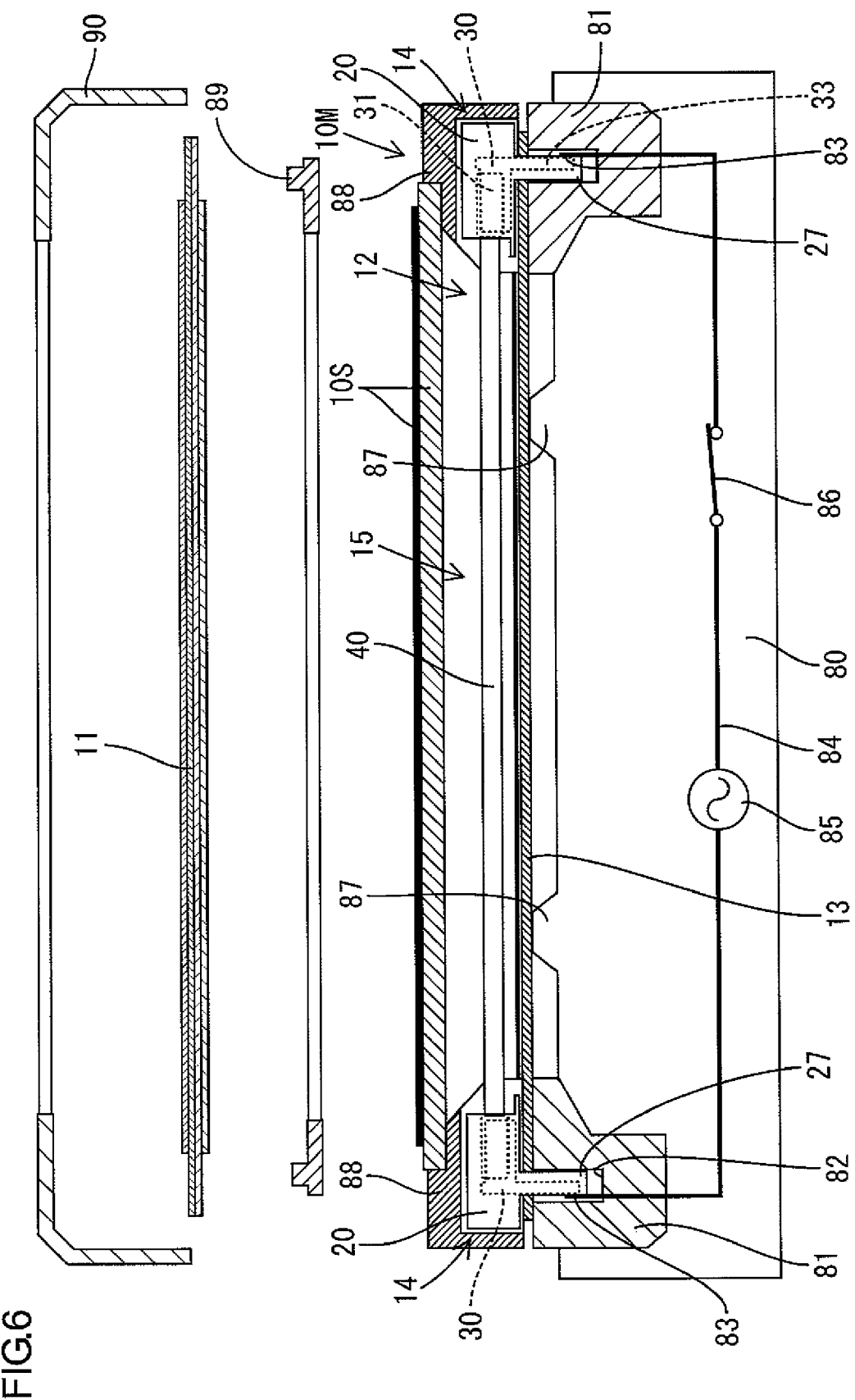
FIG. 6 is a sectional view showing a backlight module before a display panel is mounted thereto.
Figure 7:
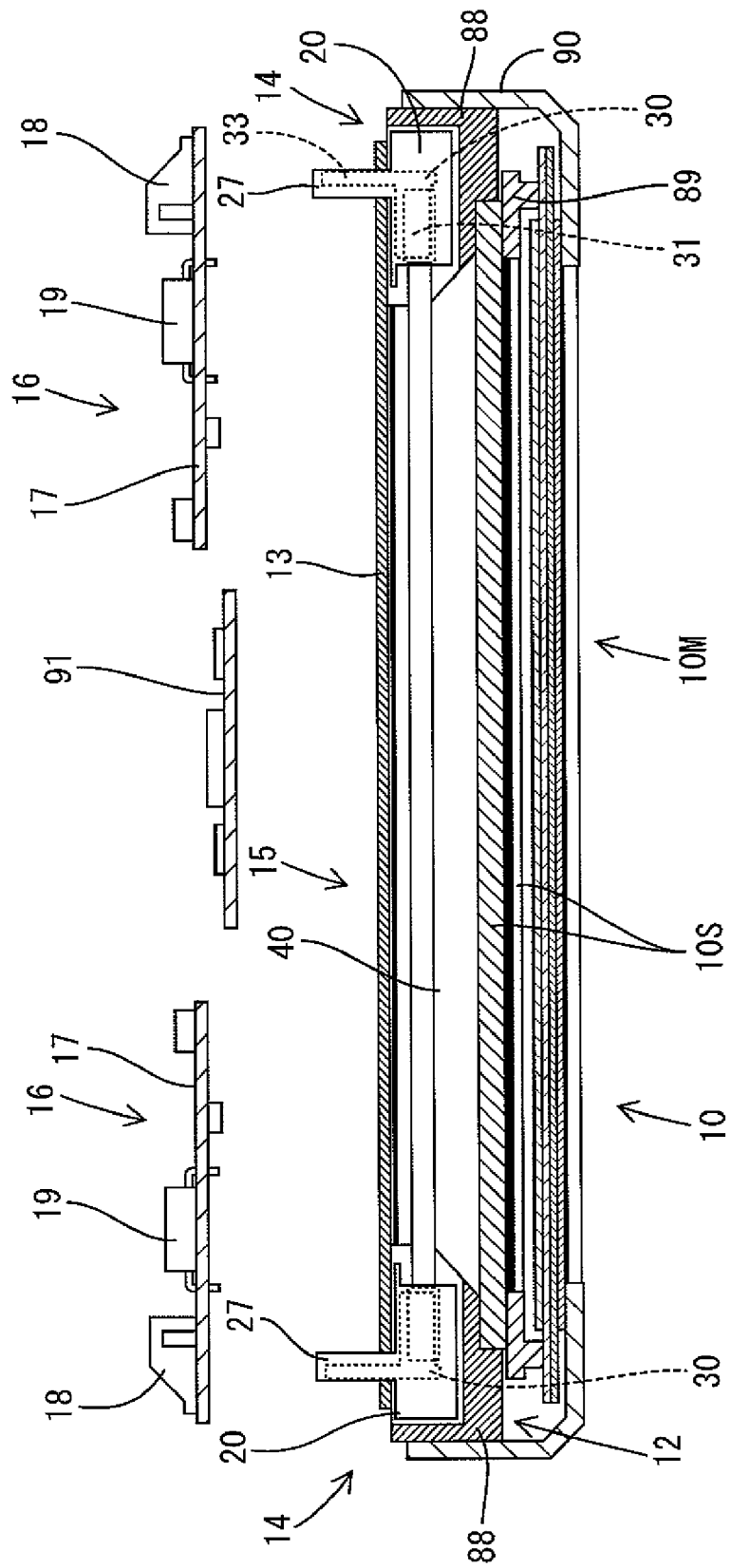
FIG. 7 is a sectional view showing the backlight module before power boards are mounted thereto.
Figure 8:
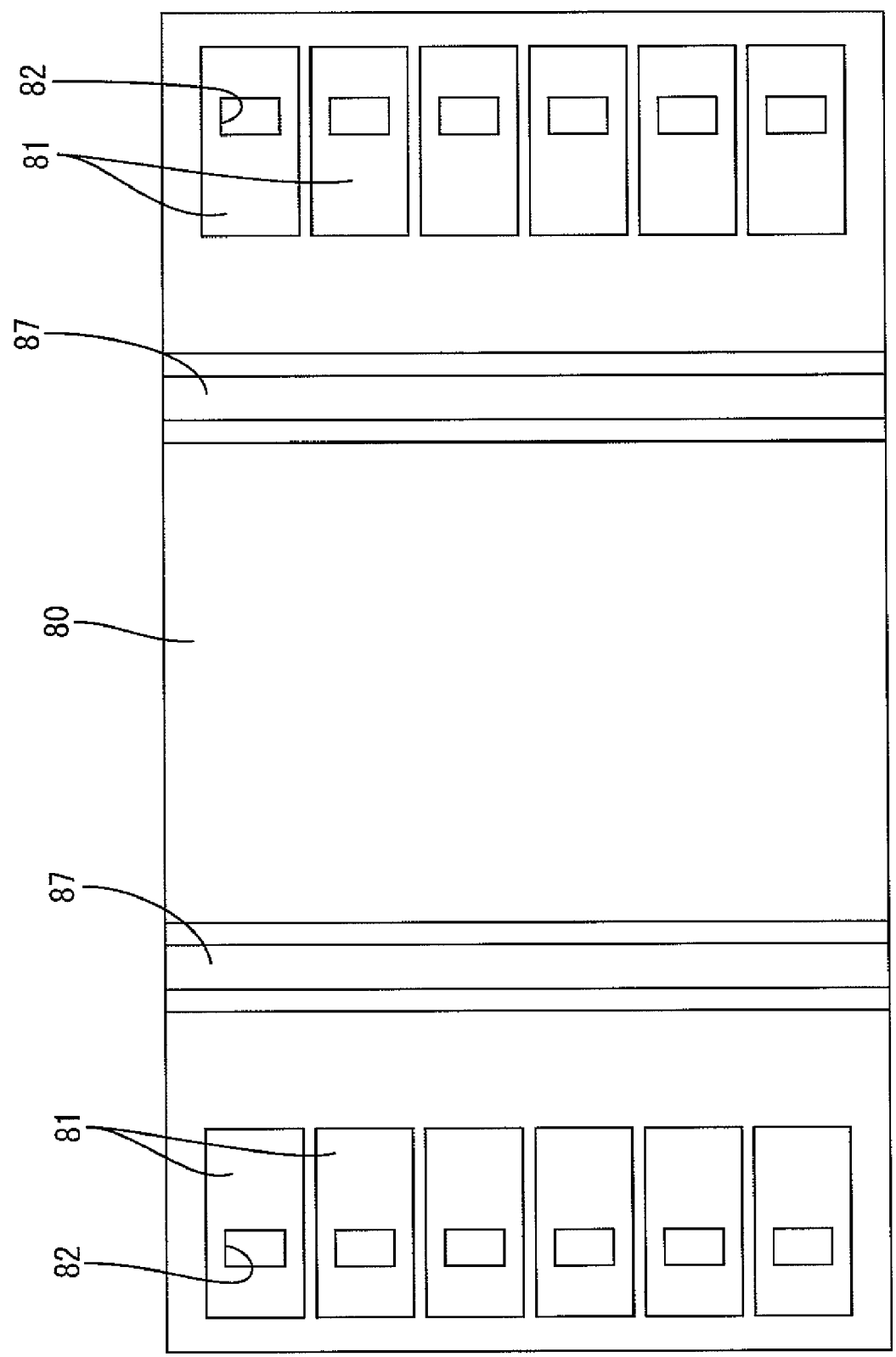
FIG. 8 is a plan view of the lighting jig.

As shown also in FIGS. 2 and 3, the lamp unit 12 includes a metallic chassis 13, which preferably has a substantially horizontally-elongated rectangular plate shape and functions as a reflector plate. Further included are a plurality of discharge tubes 15 held in a horizontal position and vertically arranged on the front side of the chassis 13 so as to be parallel or substantially parallel to one another, and a plurality of relay connectors 14 which are vertically arranged along the lateral edges of the chassis 13 so as to correspond to the discharge tubes 15. A plurality of mounting holes 13H corresponding to the ends of the discharge tubes 15 are formed through the chassis 13 so as to extend from the front side to the back side, and are vertically arranged so as to be level with the respective discharge tubes 15. The relay connectors 14 are mounted through the respective mounting holes 13H.

Each relay connector 14 includes a holder 20 made of synthetic resin, and a metallic relay terminal 30 housed in the holder 20. The holder 20 is inserted into the mounting hole 13H from the front side of the chassis 13, and is fixed to the chassis 13 so as to penetrate therethrough. When attached to the chassis 13, the front end portion of the holder 20 projects to the front side of the chassis 13, while the back end portion of the holder 20 projects to the back side of the chassis 13. A container room 23 is formed in the projecting portion of the holder 20 on the front side of the chassis 13, by removing the front surface and one lateral surface thereof. A plate-shaped wall portion 27 is provided on the projecting portion of the holder 20 on the back side of the chassis 13. The relay terminal 30 is disposed in the holder 20. The relay terminal 30 includes a tube connecting portion 31 includes a pair of upper and lower plates having a substantially circular arc shape, and further includes a plate-shaped board connecting portion 33 projecting to the back side. The tube connecting portion 31 is disposed in the container room 23, while the board connecting portion 33 is arranged along the wall portion 27.

Each discharge tube 15 preferably is a cold cathode fluorescent tube that includes a generally elongated straight glass tube 40 having a circular cross section, elongated outer leads (not shown) which project linearly from the respective ends of the glass tube 40 and coaxially with the glass tube 40, and further includes ferrules 50 attached to the respective end portions of the glass tube 40. Mercury is encapsulated in the glass tube 40. Each end portion of the glass tube 40 is melted into a substantially hemispherical shape by heat, and thereby forms a domed portion. The outer lead penetrates the domed portion.

Each ferrule 50 preferably is a single-piece component, which can be formed by bending or hammering a metallic (e.g., copper alloy) plate that is gilded and formed into a predetermined shape by punching, for example. The ferrule 50, which is simplistically shown in the figures, includes a body and a conductive portion. The body generally forms a cylindrical shape, which is fitted onto the outer circumference of each end portion of the glass tube 40. The conductive portion extends from the end portion of the body in an oblique direction leaning inwardly, so as to have elastic contact with the outer lead. The contact portion between the conductive portion and the outer lead is fixed by welding. The discharge tube 15 is mounted to the relay connectors 14, so that its end portions are held in the container rooms 23 while the ferrules 50 are conductively connected to the tube connecting portions 31 of the relay terminals 30. The mounting direction of the discharge tube 15 to the relay connectors 14 is set to be substantially perpendicular to the surface (or front surface) of the chassis 13.

The optical sheets 10S, which are mounted to the chassis 13 from the front side so as to cover the discharge tubes 15, preferably define a rectangular shape having substantially the same size as the chassis 13, and thereby can cover the entire area that includes the discharge tubes 15. The optical sheets 10S are formed of opaque materials capable of light transmission. The light from the discharge tubes 15 provided as linear light sources is diffused when being transmitted through the optical sheets 10S. Thereby, the display panel 11 can be uniformly irradiated with the backlight.

Power Board 16

Each power board 16 includes a circuit board 17 having a circuit disposed on its back surface (i.e., the surface on the opposite side of the chassis 13), electronic components 19 mounted on the back surface of the circuit board 17, and a plurality of on-board connectors 18 mounted on the back surface of the circuit board 17.

The on-board connectors 18 are vertically arranged along the lateral side edge of the circuit board 17 so as to correspond to the respective relay connectors 14. Each on-board connector 18, which is simplistically shown in the figures, includes a housing made of synthetic resin, and a metallic output terminal disposed in the housing. An engaging recess is formed on the housing so as to have an opening on the front side thereof. The opening of the engaging recess is aligned with a fitting hole that is formed through the circuit board 17 so as to extend from the front side to the back side. The output terminal, which can be formed by bending a metallic plate that is formed into a predetermined shape by punching, includes a substantially U-shaped connecting portion capable of elastic deflection. The connecting portion is arranged and located in the engaging recess. The end portion of the output terminal on the opposite side of the connecting portion is connected to the circuit disposed on the circuit board 17.

The power boards 16 are fixed to the relay terminals 14 on the back side of the chassis 13. At the time of fixation, the power board 16 is moved toward the chassis 13 while the circuit board 17 is kept parallel or substantially parallel to the chassis 13, so that the wall portion 27 of each relay connector 14 and the board connecting portion 33 arranged along the wall portion 27 penetrate the circuit board 17 through the fitting hole and are inserted or fitted into the engaging recess of the on-board connector 18. The fitting direction (or mounting direction) of the relay connector 14 to the on-board connector 18 is set to be substantially perpendicular to the surface of the chassis 13. That is, the mounting direction of the power board 16 to the relay connectors 14 is directly opposite to (or is parallel or substantially parallel to) the above-described mounting direction of the discharge tube 15 to the relay connector 14. When the on-board connectors 18 have reached a proper state of being fitted onto the relay connectors 14, the power board 16 is fixed to the chassis 13 by screws or other suitable fastening or connecting elements.

When the on-board connector 18 is fitted onto the relay connector 14, the connecting portion of the on-board connector 18 can have elastic contact with the plate-shaped board connecting portion 33 of the relay connector 14. Thereby, the output terminal of the on-board connector 18 is electrically conductively connected to the relay terminal 30 of the relay connector 14. Thus, the power board 16 is connected to the discharge tube 15 via relay connectors 14, so that the power from the power board 16 can be supplied to the discharge tube 15.

Lighting Jig 80

As shown in FIGS. 4 to 6 and 8, the lighting jig 80 generally forms a flat block-shaped configuration, and its planar figure is a rectangle slightly larger than the chassis 13 (or, the lamp unit 12 or the backlight module 10M). A plurality of connector portions 81 (specifically, the same number of connector portions as relay connectors 14) are embedded in the upper surface of the lighting jig 80, and are arranged in a line along the lateral edges thereof. The distance between adjacent connector portions 81 is preferably set to be the same as the distance between adjacent relay connectors 14. A recess portion 82 is formed on each connector portion 81 so as to have an opening on the upper side thereof, and a connecting terminal 83 is provided in the recess portion 82. The recess portion 82 may be the same in form as the engaging recess of the on-board connector 18, or alternatively, may differ in form from the engaging recess. In any case, it should be formed so that the wall portion 27 and the board connecting portion 33 of the relay connector 14 can be fitted into the recess portion 82 from above. The connecting terminal 83 may be the same in form as the output terminal of the power board 16, or alternatively, may differ in form from the output terminal. In any case, it should be formed so that the board connecting portion 33 can be conductively connected to the connecting terminal 83 when the wall portion 27 and the board connecting portion 33 are fitted into the recess portion 82.

A feed circuit 84 is provided in the lighting jig 80. The feed circuit 84 connects between the connecting terminals 83 of the right-side connector portions 81 and the connecting terminals 83 of the left-side connector portions 81. A power supply source 85 and an open/close switch 86 are provided on the feed circuit 84. On the upper surface of the lighting jig 80, a pair of laterally-spaced bearing portions 87 are formed as rib-shaped protrusions.

Manufacturing Process for Display Device D

The display device D can be manufactured in the following manner.

First, on a workbench not shown, or the like, the chassis 13 is horizontally placed with its front side up. Then, relay connectors 14 are mounted through the mounting holes 13H of the chassis 13, from above. The mounting direction of the relay connectors 14 to the chassis 13 is set to be substantially perpendicular to the front face of the chassis 13. Next, discharge tubes 15 are mounted to the relay connectors 14 so that the end portions (or ferrules 50) of each discharge tube 15 are fitted into the container rooms 23. The mounting direction at the time is the same as the mounting direction of the relay connectors 14 to the chassis 13, i.e., the direction substantially perpendicular to the front face of the chassis 13. After the mounting of the discharge tubes 15 is completed, retainer 88 is mounted to the chassis 13. The mounting direction at the time is also the same as the mounting direction of the relay connectors 14 to the chassis 13. The retainer 88 can be provided as a mounting base that supports the optical sheets 10S, a frame 89, the display panel 11 and a bezel 90. Note that the retainer 88 can be eliminated depending on the type of a display device D. The lamp unit 12 is thus completed.

Next, the lamp unit 12 is set on the lighting jig 80. At the time, the lamp unit 12 is moved downward toward the upper surface of the lighting jig 80 while the chassis 13 is held in a horizontal position, so that the wall portion 27 and the board connecting portion 33 of each relay connector 14 are fitted into the recess portion 82 of the corresponding connector portion 81. The engaging direction of the relay connectors 14 with the connector portions 81 (i.e., the mounting direction of the lamp unit 12 to the lighting jig 80) is the same as the mounting direction of the relay connectors 14 to the chassis 13. When the relay connectors 14 have reached a proper state of being fitted into the connector portions 81, the lower surface (or back surface) of the chassis 13 have abutting contact with the upper surfaces of the connector portions 81 and the upper surfaces of the bearing portions 87. Due to the abutting contact, the lamp unit 12 can be horizontally supported without a flexion deformity of the chassis 13.

When the lamp unit 12 is set on the lighting jig 80, the ferrules 50 of each discharge tube 15 are conductively connected to the feed circuit 84 via the relay terminals 30 (or relay connectors 14) and via the connecting terminals 83 (or connector portions 81). If the switch 86 is closed in this condition, the power from the power supply source 85 is supplied to all the discharge tubes 15. Thereby, the discharge tubes 15 can be lighted, although the power boards 16 are not connected to the relay connectors 14. While the discharge tubes 15 are thus lighted, the plurality of optical sheets 10S are mounted on the retainer 88 so as to cover the upper side. At the time, the optical sheets 10S are moved toward the lamp unit 12 while being held in a horizontal position (i.e., held substantially parallel to the chassis 13). The mounting direction of the optical sheets 10S is substantially the same as the mounting direction of the relay connectors 14 to the chassis 13.

When the optical sheets 10S are thus mounted, the light from the lighted discharge tubes 15 can be radiated to the optical sheets 10S from the back side. Therefore, the inspection, or the like, for the optical sheets 10S (e.g., the visual check for the surfaces of the optical sheets 10S that aims to detect a faulty optical sheet 10S, or the dust elimination when necessary) can be readily achieved with high accuracy.

After the mounting of the optical sheets 10S is completed, the rectangular-shaped frame 89 is mounted to the retainer 88 so that the optical sheets 10S are fixed with their peripheral edge portions sandwiched between the retainer 88 and the frame 89. The mounting direction of the frame 89 to the retainer 88 is substantially the same as the mounting direction of the relay connectors 14 to the chassis 13. When the optical sheets 10S are mounted to the lamp unit 12 as described above, the backlight module 10M is completed.

Thereafter, the display panel 11 is placed and mounted on the front side of the optical sheets 10S so as to overlap therewith. After the mounting of the display panel 11 is completed, the frame-shaped bezel 90 is mounted to the retainer 88 so that the display panel 11 is fixed with its peripheral edge portion sandwiched between the frame 89 and the bezel 90. Both of the mounting direction of the display panel 11 to the backlight module 10M and the mounting direction of the bezel 90 are substantially the same as the mounting direction of the relay connectors 14 to the chassis 13.

After the mounting of the display panel 11 and the bezel 90 to the backlight module 10M is completed, the backlight module 10M is detached from the lighting jig 80, and is placed upside-down on the workbench not shown so as to face up the back surface of the chassis 13. In this condition, the power boards 16 and a control board 91 (shown in FIG. 7) are mounted on the back surface of the chassis 13, and are fixed by screws or other suitable fastening or connecting elements. The mounting direction of the power boards 16 and the control board 91 to the chassis 13 (or to the backlight module 10M) is directly opposite to the mounting direction of the relay connectors 14 to the chassis 13, i.e., parallel or substantially parallel to the mounting direction of the relay connectors 14 to the chassis 13. At the time of mounting the power boards 16, the wall portions 27 and the board connecting portions 33 of the relay connectors 14 are fitted into the engaging recesses of the on-board connectors 18. When the power boards 16 are thus mounted, the board connecting portions 33 of the relay terminals 30 are conductively connected to the connecting portions of the output terminals. Therefore, the power from the power boards 16 can be supplied to the discharge tubes 15 via the relay connectors 14 (or relay terminals 30). When the power boards 16 are thus mounted to the backlight module 10M, the lighting device 10 is completed and concurrently the display device D is completed.

Effects of the Present Preferred Embodiment

As described above, in the present preferred embodiment, the relay connectors 14 are mounted to the chassis 13 so as to be exposed to the back side thereof. The wall portions 27 (or board connecting portions 33) of the relay connectors 14 provided as connecting portions for connection to the power boards 16 are conductively engaged with the connector portions 81 (or connecting terminals 83) of the lighting jig 80, so that the power from the power supply source 85 of the lighting jig 80 can be supplied to the discharge tubes 15 via the connector portions 81 and the relay connectors 14. The discharge tubes 15 can be thus lighted, if the power boards 16 are not connected to the relay connectors 14. At the time, the lighting jig 80 is arranged to face the back surface of the chassis 13, and therefore will not interfere with the mounting of the optical sheets 10S to the front side of the chassis 13.

Each of the mounting direction of the discharge tubes 15 to the relay connectors 14 and the mounting direction of the power boards 16 to the relay connectors 14 is set to be substantially perpendicular to the surface of the chassis 13. Therefore, the discharge tubes 15 and the power boards 16 can be mounted to the chassis 13 so as to form a stack structure. The stackability enables the assembling to be performed by an automatic machine.

Preferred Embodiment 2

Next, preferred embodiment 2 of the present invention will be explained with reference to FIGS. 10 to 21. In the present preferred embodiment 2, the construction of a lighting device 110 differs from that of preferred embodiment 1. The other constructions are similar to preferred embodiment 1. Therefore, the same constructions are designated by the same symbols, and explanations for the constructions, operations and effects thereof are omitted.

Overview of Lighting Device 110

Figure 10:
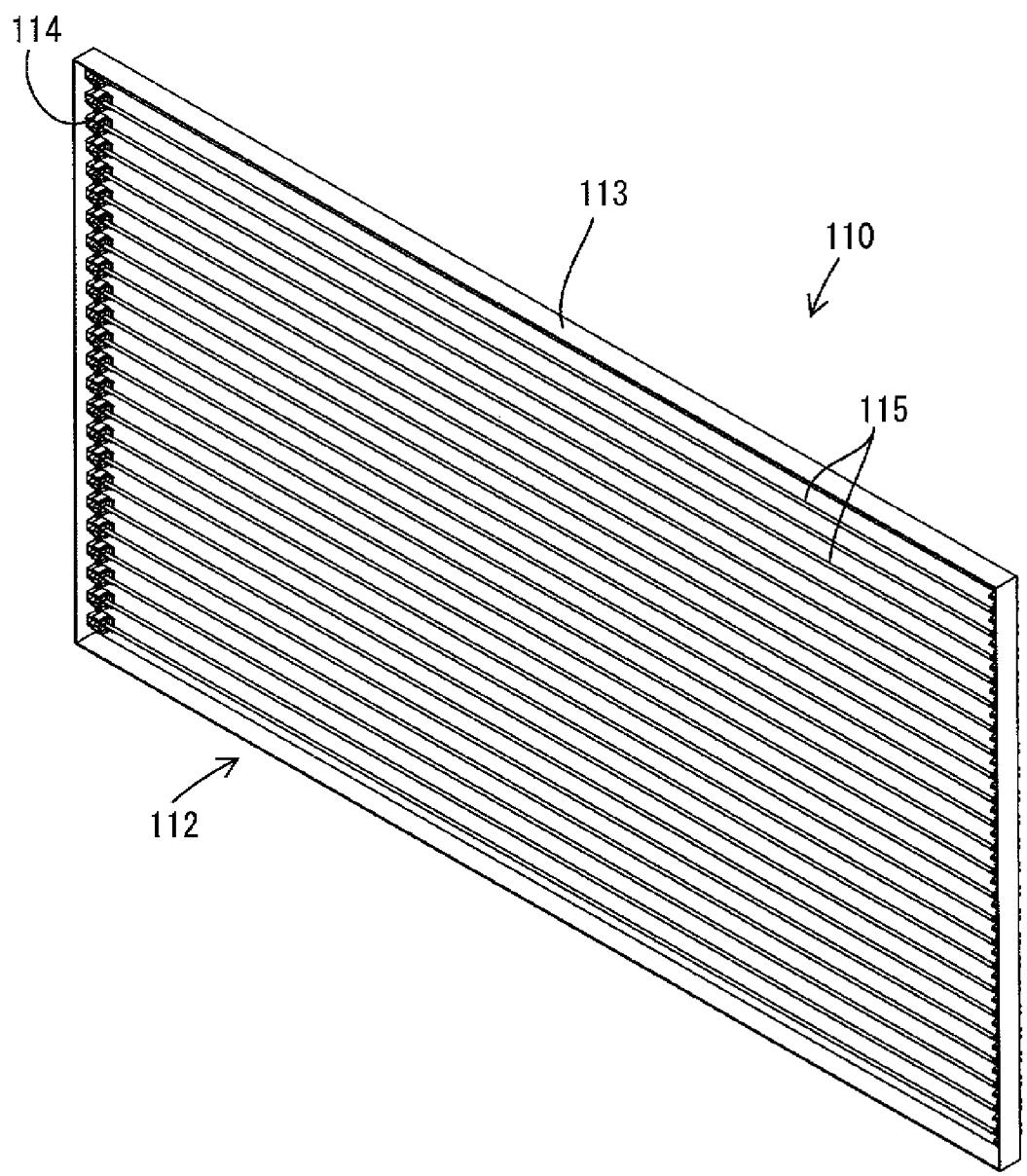
FIG. 10 is a front perspective view of a lighting device according to preferred embodiment 2 of the present invention.
Figure 11:
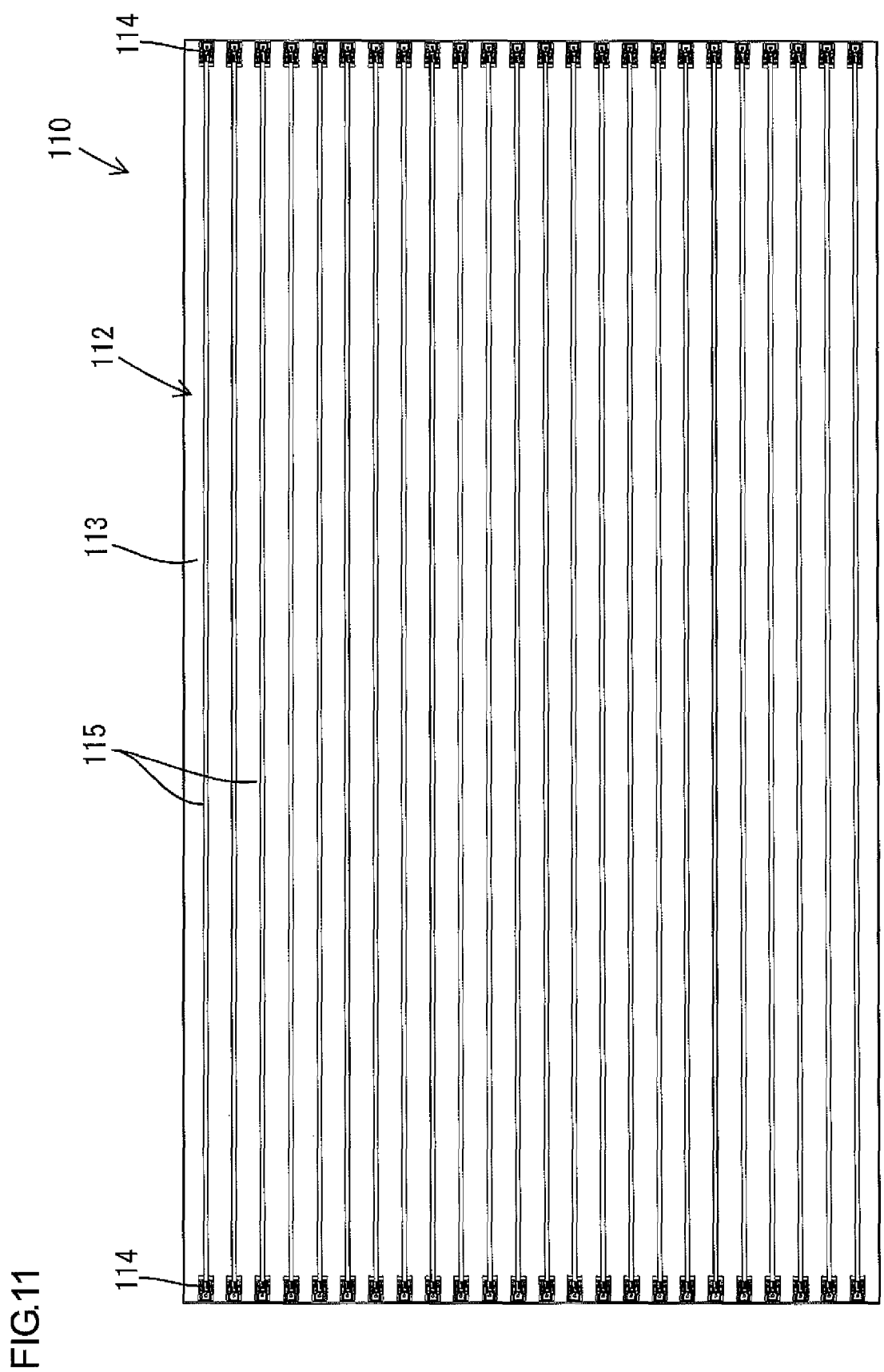
FIG. 11 is a front view of the lighting device.
Figure 12:
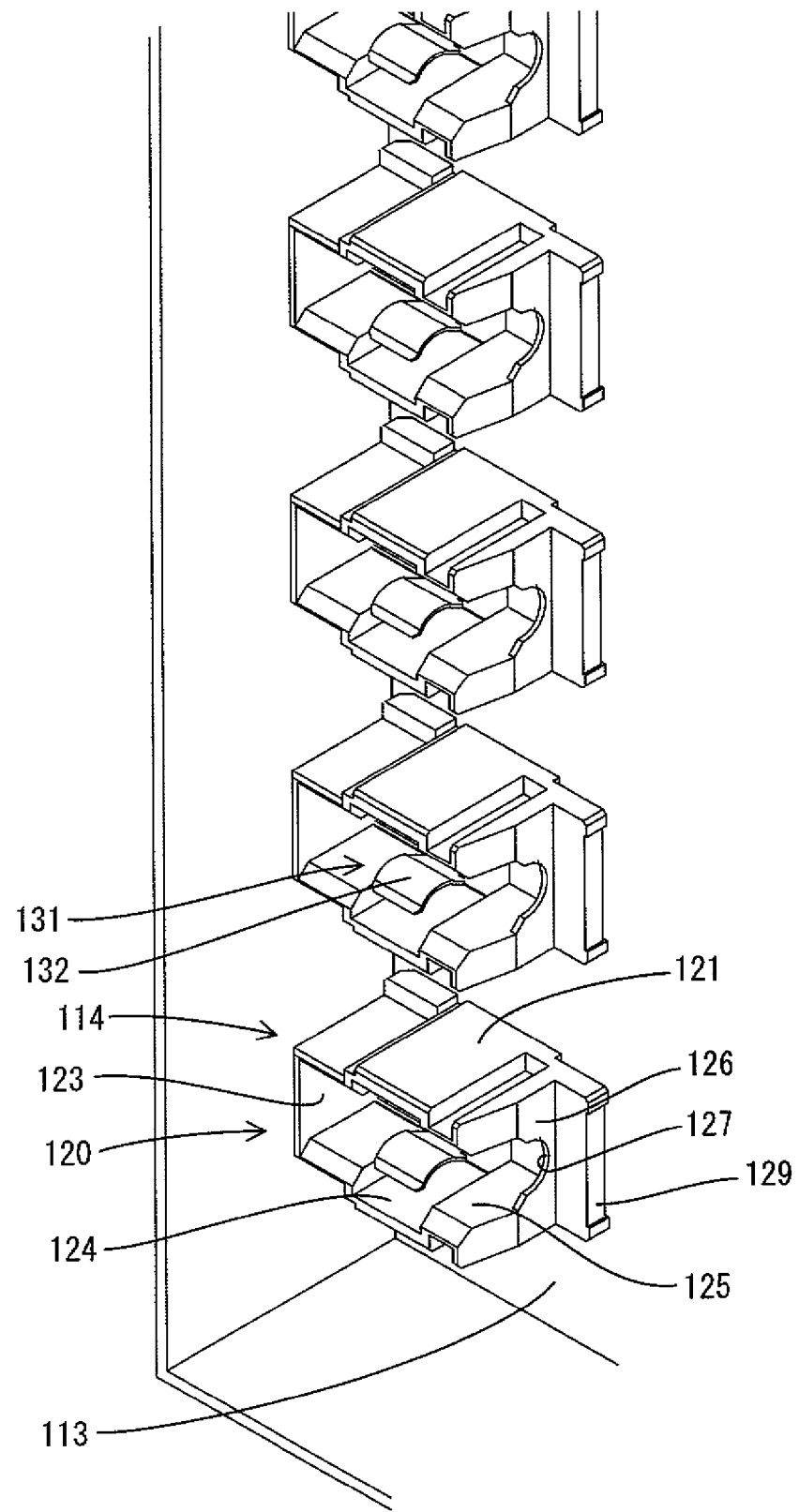
FIG. 12 is a perspective view of relay connectors.
Figure 13:
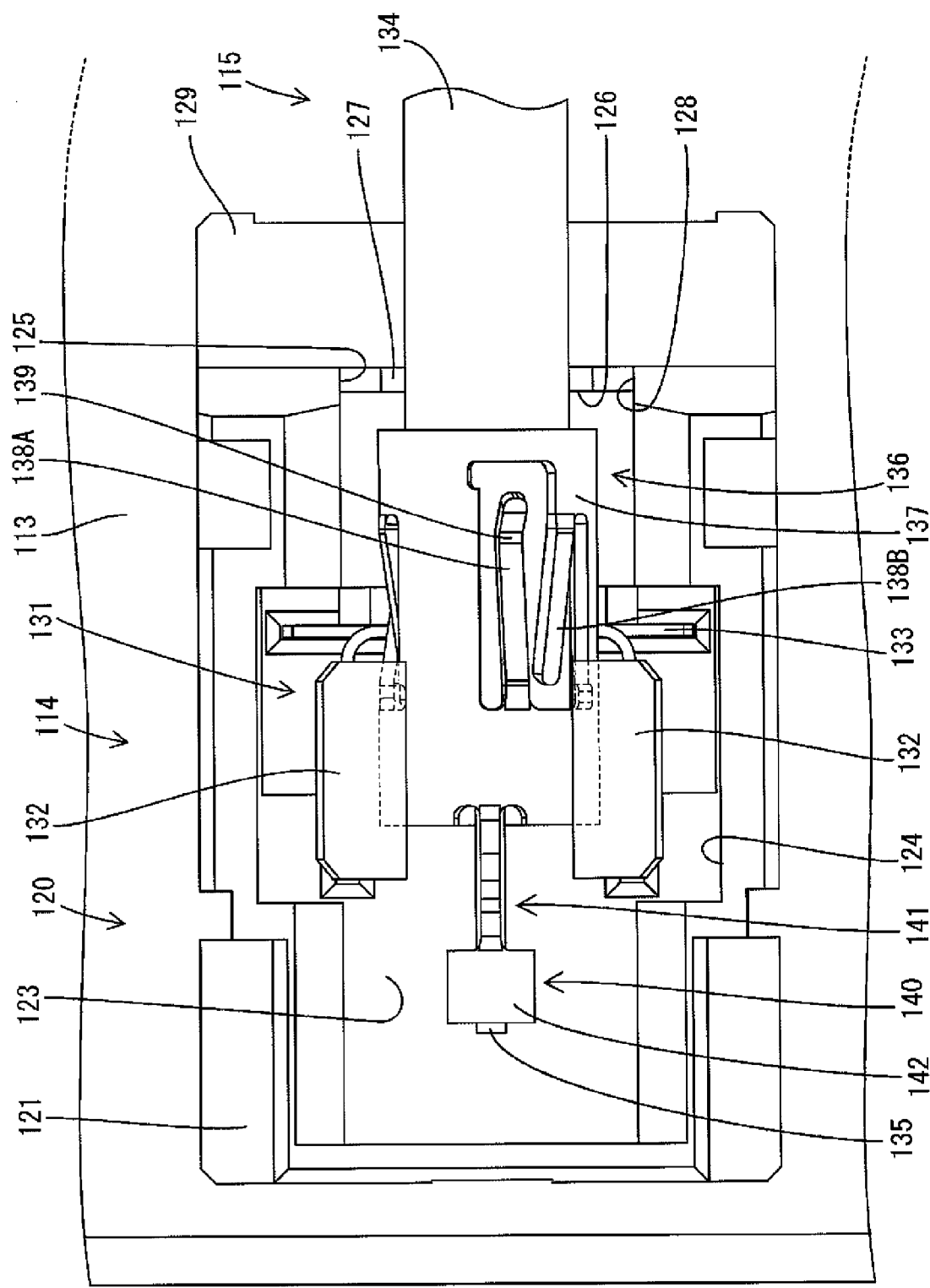
FIG. 13 is a partially-enlarged front view showing a connecting structure between a relay connector and a discharge tube.
Figure 14:
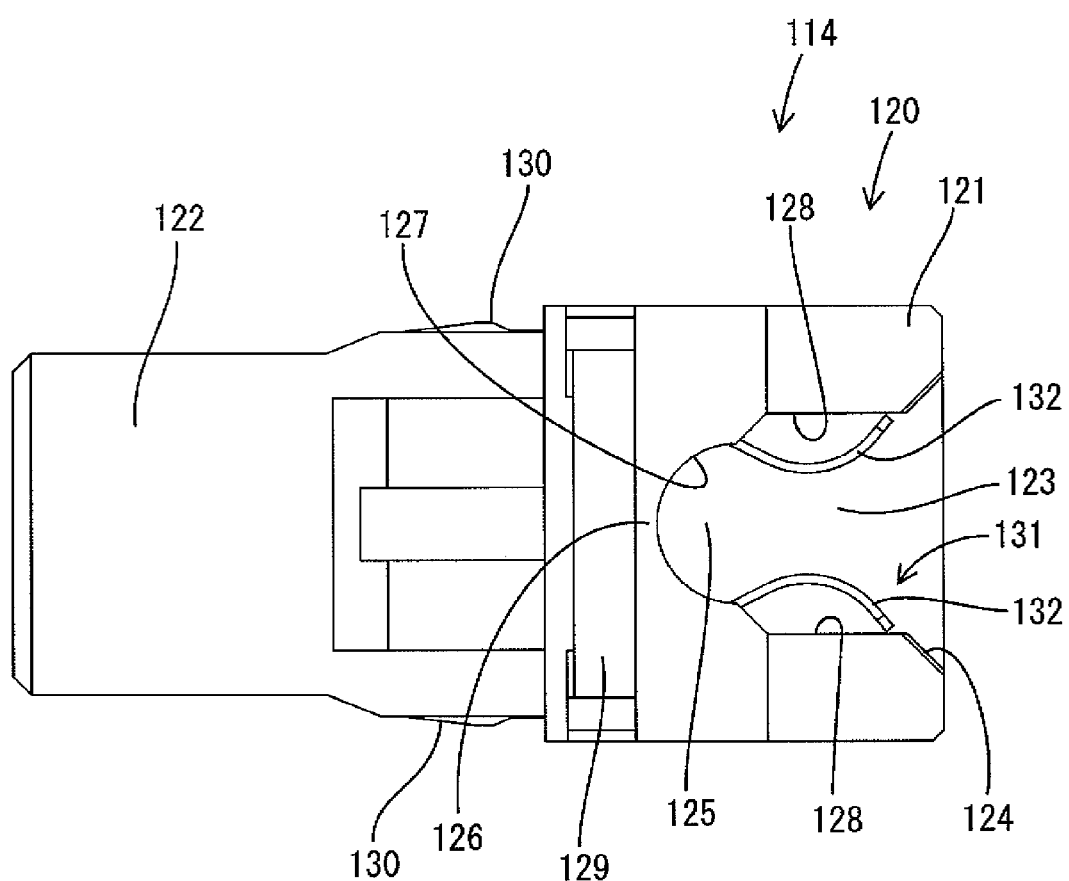
FIG. 14 is a side view of a relay connector.
Figure 21:
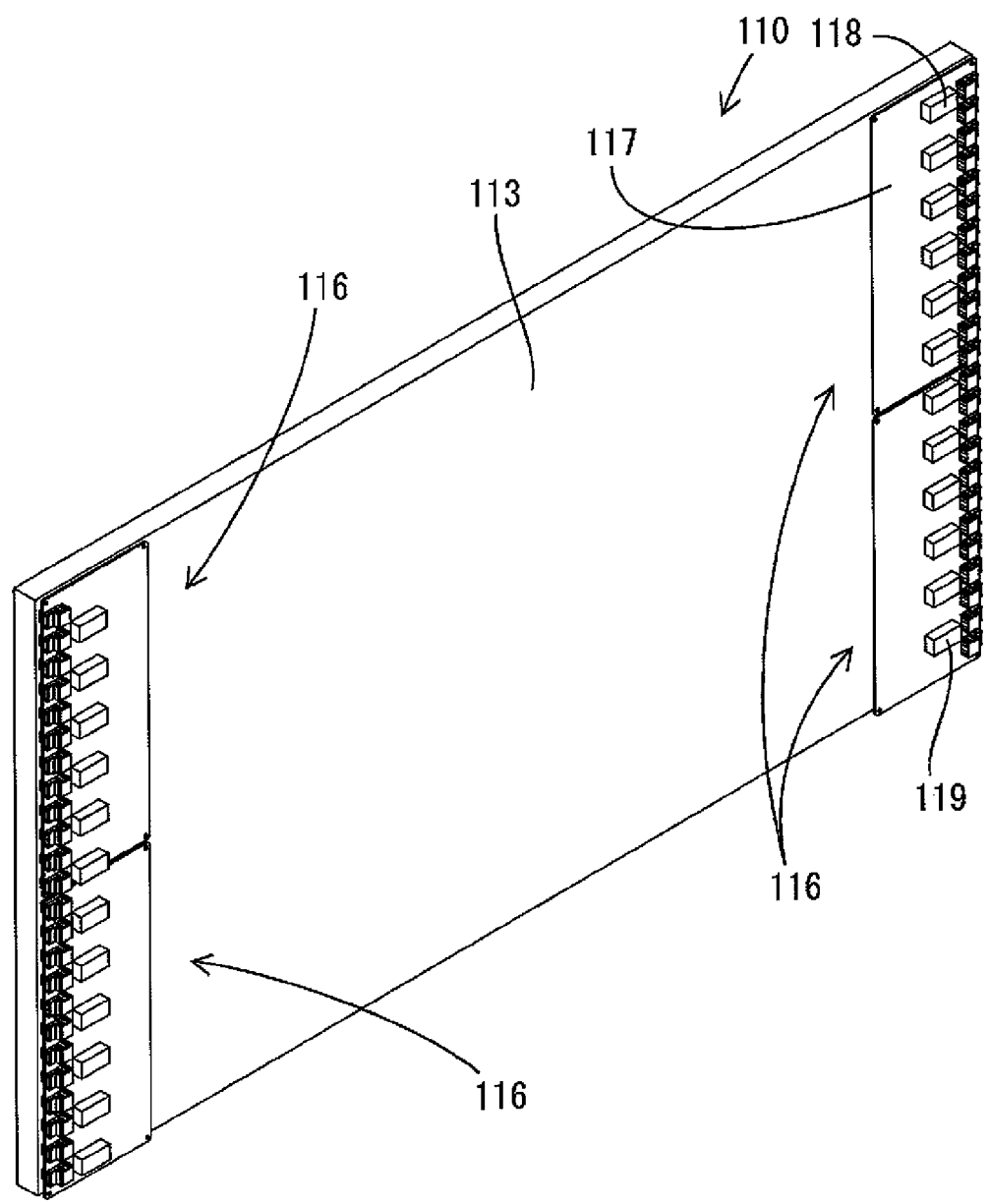
FIG. 21 is a rear perspective view of the lighting device.

The lighting device 110 includes a lamp unit 112 and power boards 116, as shown in FIGS. 10, 11 and 21. The lamp unit 112 includes a metallic chassis 113, which preferably has a substantially horizontally-elongated rectangular plate shape and functions as a reflector plate. Further included are a plurality of discharge tubes 115 held in a horizontal position and vertically arranged on the front side of the chassis 113 so as to be parallel or substantially parallel to one another, and a plurality of relay connectors 114 which are vertically arranged along the lateral edges of the chassis 113 so as to correspond to the discharge tubes 115. The power boards 116 are disposed on the back side of the chassis 113 so as to supply power to the discharge tubes 115 via the relay connectors 114.

Figure 15:
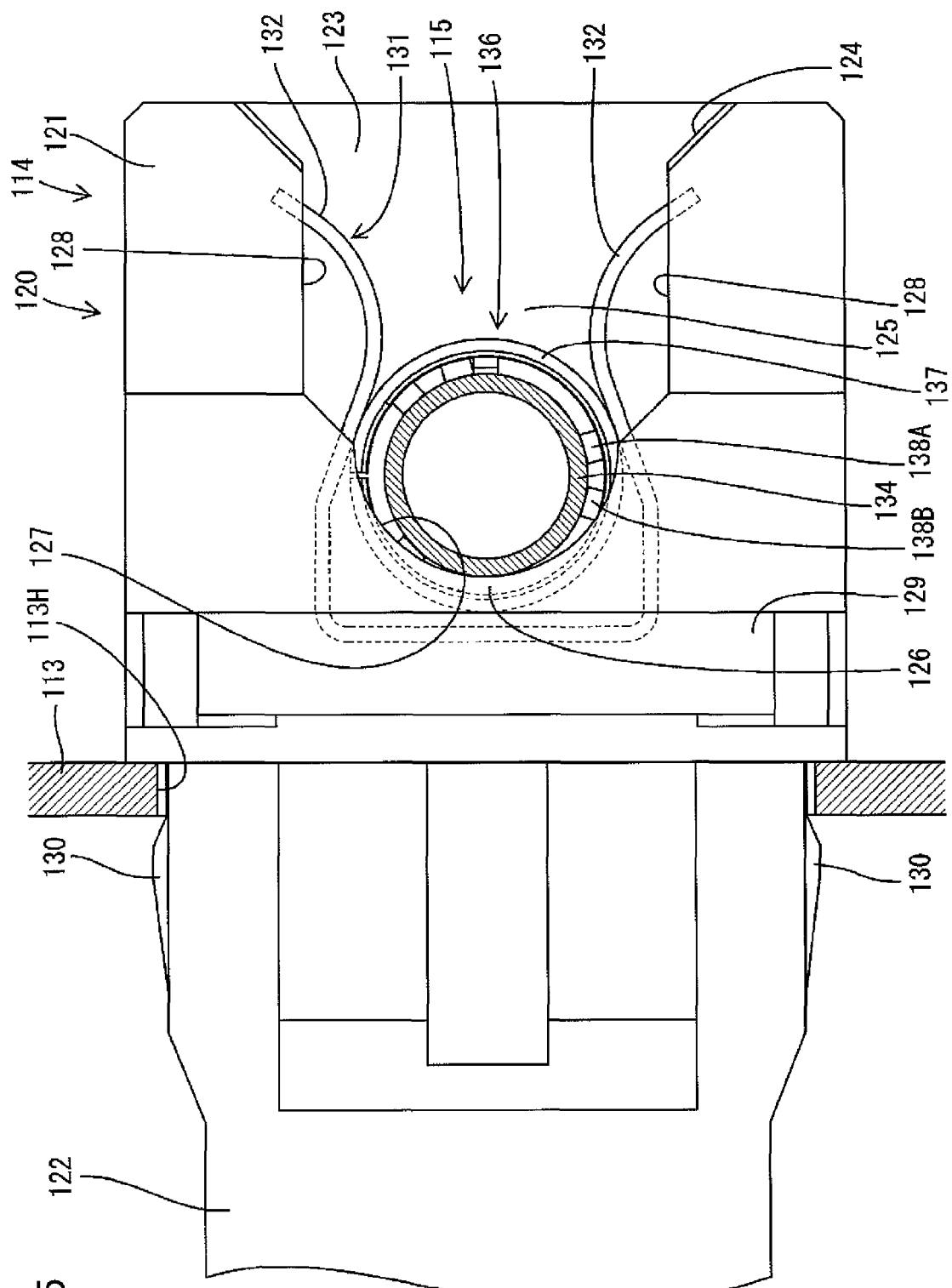
FIG. 15 is a sectional view showing that a ferrule on a discharge tube is capable of engaging with a stopper.
Figure 16:
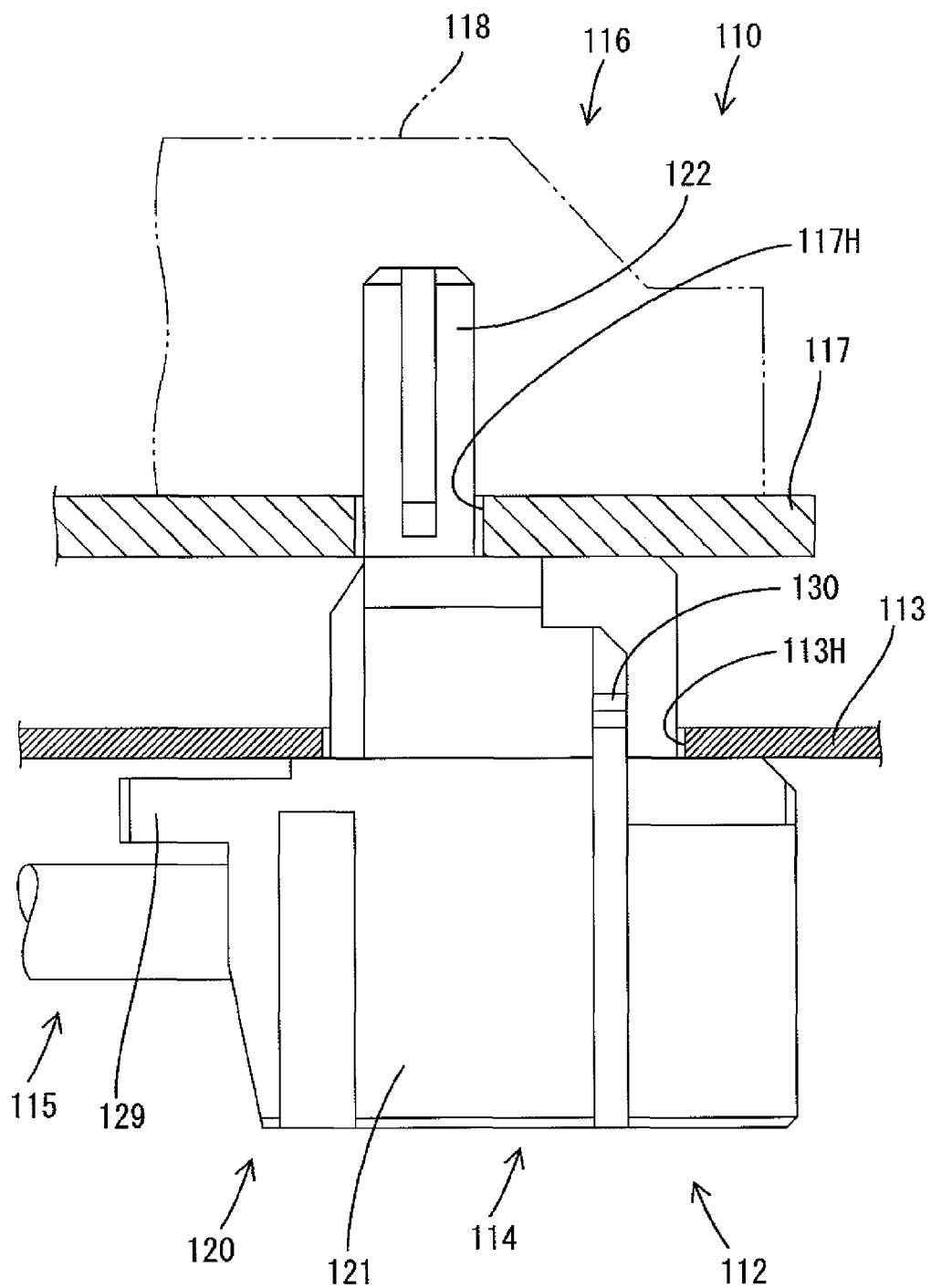
FIG. 16 is a sectional view showing a connecting structure between a relay connector and a power board.

A plurality of substantially rectangular mounting holes 113H corresponding to the ends of the discharge tubes 115 are formed through the chassis 113 so as to extend from the front side to the back side, and are vertically arranged to be level with the respective discharge tubes 115 (See FIGS. 15 and 16). The relay connectors 114 are mounted through the respective mounting holes 113H.

Relay Connector 114

As shown in FIGS. 12 to 16, each relay connector 114 includes a holder 120 made of synthetic resin, and a relay terminal 131 that is housed in the holder 120 and made of metal (e.g., stainless steel).

The holder 120 includes a box-shaped portion 121 that has a block-shape configuration as a whole, and further includes a wall portion 122 that projects backward from the back surface of the box-shaped portion 121.

A container room 123 is formed in the box-shaped portion 121, so as to have an opening extending from the front side to the lateral side (i.e., the lateral side on the opposite side of the lateral edge portion of the chassis 113). The front opening portion of the opening of the container room 123 is provided as a receiving opening 124, into which an end portion (or ferrule 136) of the discharge tube 115 is fitted from the front side. The lateral opening portion is provided as an escape opening 125 for preventing interference with the glass tube 134 when the end portion of the discharge tube 115 is held in the container room 123. A stopper 126 is formed on the escape opening 125, so as to bulge inward from the opening edge and form a plate-shaped configuration. Due to the stopper 126, the escape opening 125 is narrowed so as to form a substantially U-shaped opening. The vertical size of the substantially U-shaped escape opening 125 is set to be smaller than the inner diameter of the body 137 of the ferrule 136 and be equal to or slightly larger than the outer diameter of the glass tube 134 of the discharge tube 115. On the escape opening 125, a concave portion 127 having a semicircular shape is formed on the far end portion of the opening edge. The radius of curvature of the concave portion 127 is set to be equal to or slightly larger than the radius of curvature of the outer circumference of the glass tube 134. On the escape opening 125, a pair of upper and lower guiding portions 128 are formed on areas of the opening edge on the front side of the concave portion 127.

On the box-shaped portion 121, an extended portion 129 extending parallel or substantially parallel to the chassis 113 is formed on the lateral surface of the box-shaped portion 121 that includes the escape opening 125. The extended portion 129 extends so as to separate the front surface of the chassis 113 from the escape opening 125. A pair of upper and lower retaining protrusions 130 are formed on the outer surface (i.e., upper surface and lower surface) of the box-shaped portion 121.

The relay terminal 131 is held within the holder 120. The relay terminal 131 can be formed by bending a metallic plate that is formed into a predetermined shape by punching, for example. The relay terminal 131 includes a pair of vertically symmetrical elastic pressing portions 132 formed of curved plates, and further includes a board connecting portion 133 formed as a flat plate-shaped portion that projects to the back side. The pair of elastic pressing portions 132, which are housed in the container room 123, can deflect elastically and vertically so as to increase distance therebetween. The vertical distance between the elastic pressing portions 132 is shortest at a position corresponding to the front side of the concave portion 127 of the stopper 126. The minimum distance between the elastic pressing portions 132, when elastic pressing portions 132 are not forced into elastic deflection or are in a free state, is set to be smaller than the outer diameter of the body 137 of the ferrule 136 attached on the discharge tube 115. On the other hand, the board connecting portion 133 projects from the back surface of the box-shaped portion 121 so as to be exposed to the outside of the holder 120, and extends backwards along the wall portion 122.

When the relay connector 114 is mounted to the chassis 113, the wall portion 122 of the holder 120 is inserted into a mounting hole 113H from the front side of the chassis 113. Thereby, the outer surface of the box-shaped portion 121 comes in contact with the opening edge of the mounting hole 113H on the front surface of the chassis 113, while the retaining protrusions 130 are locked by the opening edge of the mounting hole 113H on the back surface of the chassis 113. Thus, the chassis 113 is sandwiched between the outer surface of the box-shaped portion 121 on the front side and the retaining protrusions 130 on the back side. Thereby, the holder 120 is fixed to the chassis 113 so that its movement in the mounting direction (i.e., the through direction of the mounting hole 113H) is restricted. Then, the mounting of the relay connector 114 to the chassis 113 is completed. When the relay connector 114 is attached to the chassis 113, the box-shaped portion 121 as the front end portion of the holder 120 projects (or is exposed) to the front side of the chassis 113 while the wall portion 122 as the back end portion of the holder 120 projects (or is exposed) to the back side of the chassis 113.

Discharge Tube 115

Figure 17:
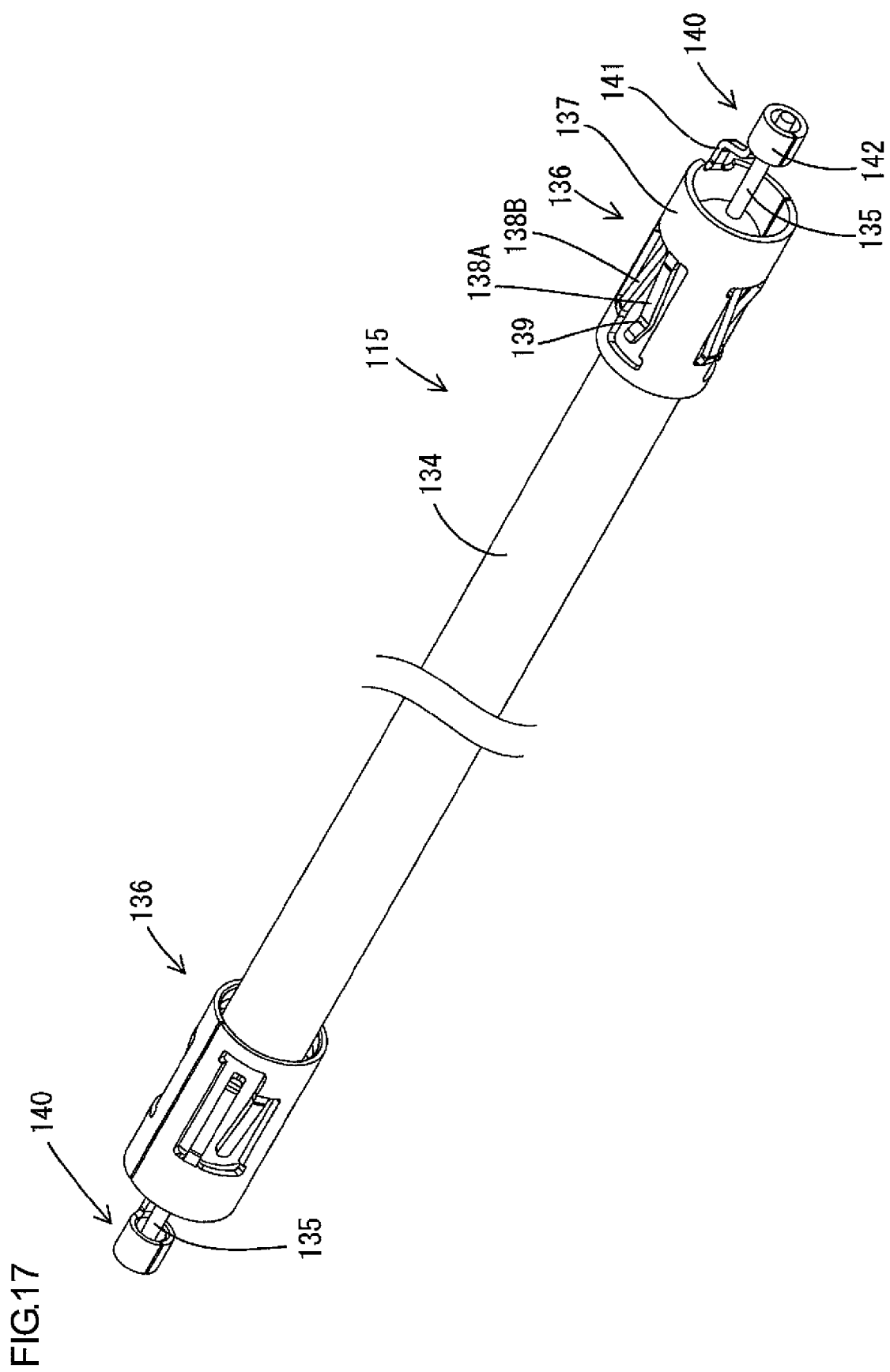
FIG. 17 is a perspective view of a discharge tube.

Referring to FIG. 17, each discharge tube 115 preferably is a cold cathode fluorescent tube that includes a generally elongated straight glass tube 134 having a circular cross section, and elongated metallic (e.g., nickel or cobalt metal) outer leads 135 which have a circular cross section and project linearly from the respective ends of the glass tube 134 and coaxially with the glass tube 134. Further included are ferrules 136 attached to the respective end portions of the glass tube 134. Mercury is encapsulated in the glass tube 134. Each end portion of the glass tube 134 is melted into a substantially hemispherical shape by heat, and thereby forms a domed portion. The outer lead 135 penetrates the domed portion.

Figure 18:
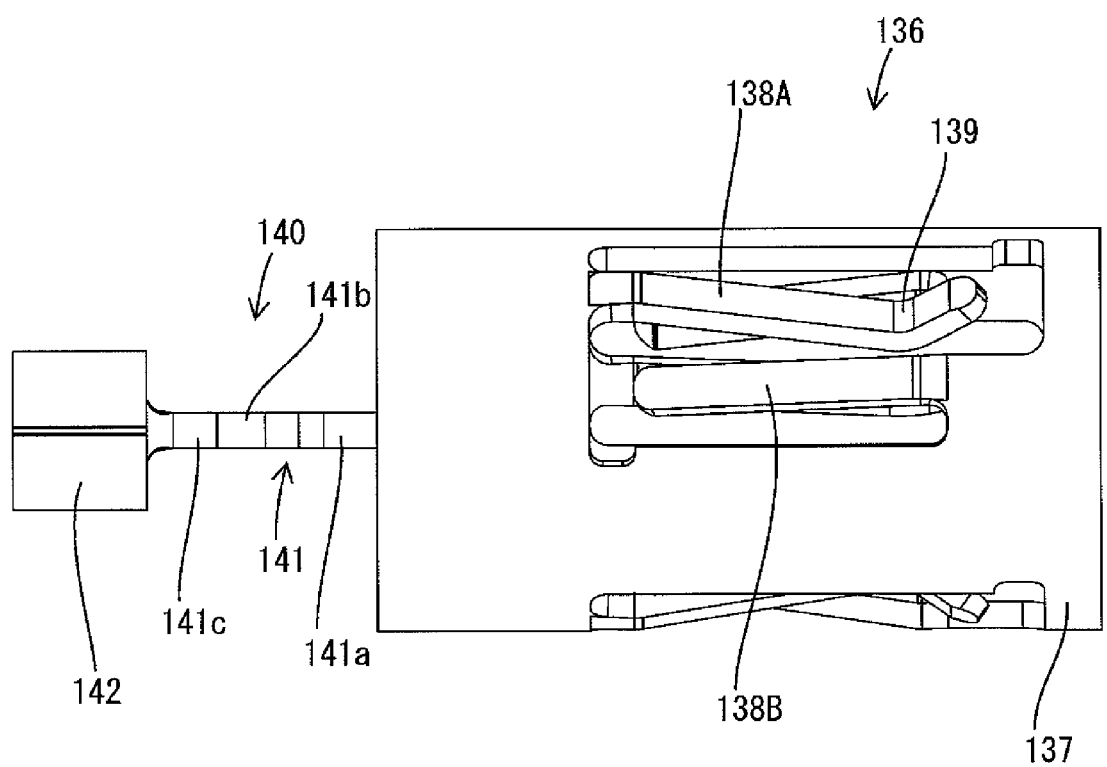
FIG. 18 is a rear view of a ferrule.
Figure 19:
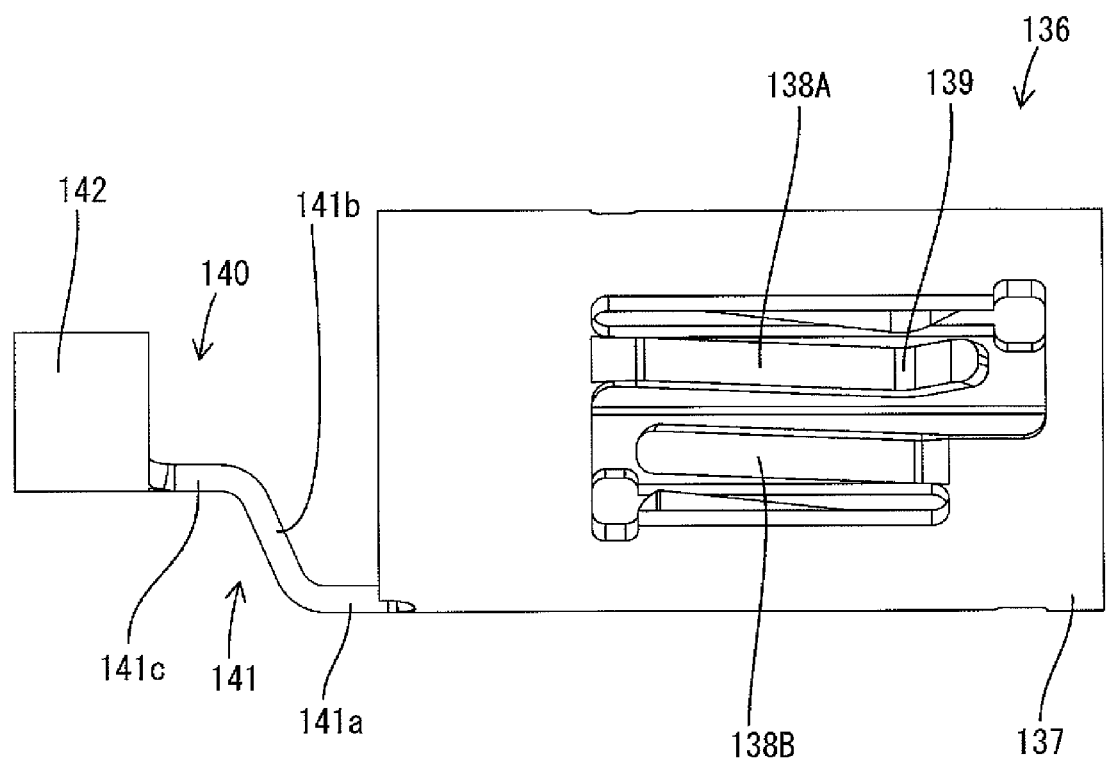
FIG. 19 is a plan view of the ferrule.
Figure 20:
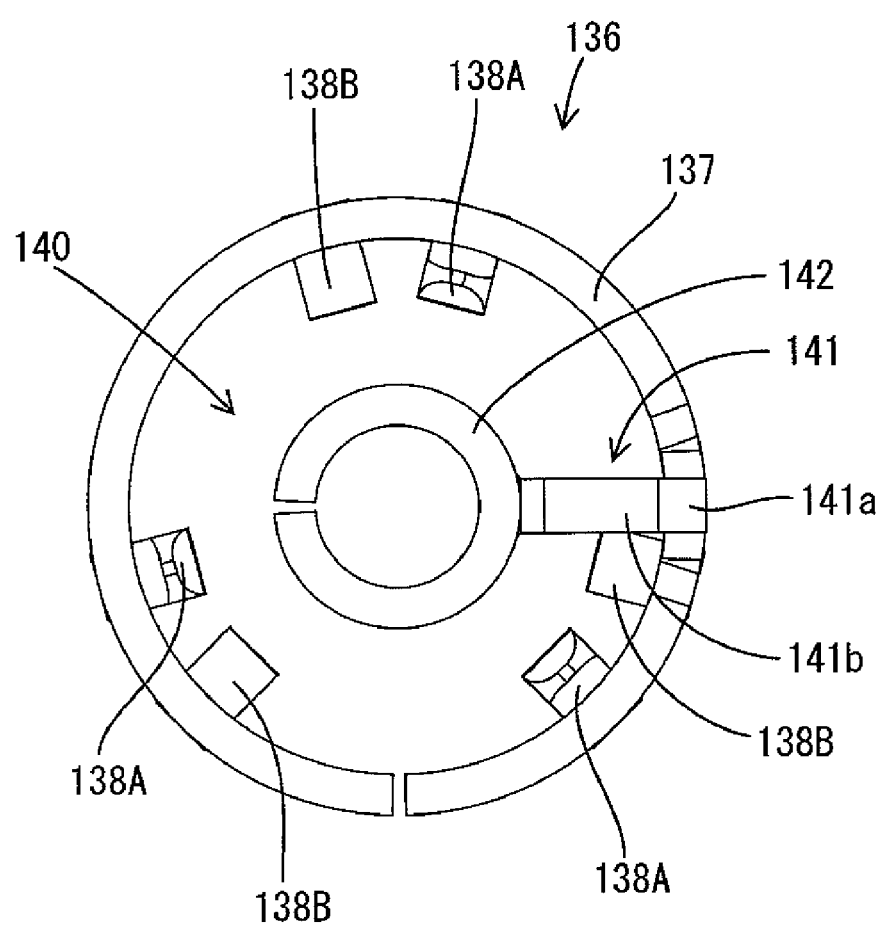
FIG. 20 is a side view of the ferrule.

Referring to FIGS. 18 to 20, each ferrule 136 preferably is a single-piece component, which can be formed by bending or hammering a metallic (e.g., stainless steel) plate that is formed into a predetermined shape by punching, for example. The ferrule 136 includes a body 137 and a conductive portion 140. The body 137 preferably has a substantially cylindrical shape concentric with the glass tube 134. The inner diameter of the body 137 preferably is slightly larger than the outer diameter of the glass tube 134.

Three pairs of elastic gripping portions 138A, 138B are formed on the body 137 by making slit-shaped cuts in portions thereof, which are arranged at even angular intervals along the circumferential direction.

A first elastic gripping portion 138A, i.e., one of a pair of elastic gripping portions 138A, 138B, is generally formed as a cantilevered portion extending posteriorly (specifically, in an oblique direction slightly leaning radially inwardly), which is capable of elastic and radial deflection with a supported point on its proximal end (or anterior end). A curved portion 139 is formed on the distal end portion (or posterior end portion) of the first elastic gripping portion 138A, so as to curve in an oblique direction leaning radially outwardly. The outer surface of the curve (or inwardly facing surface) of the curved portion 139 is provided as a contact point when abutting on the outer circumferential surface of the glass tube 134. The imaginary line that connects the contact points provided on the three first elastic gripping portions 138A forms a circle concentric with the body 137. The diameter of the imaginary circle, when the first elastic gripping portions 138A are not forced into elastic deflection or in a free state, preferably is smaller than the outer diameter of the glass tube 134.

A second elastic gripping portion 138B, i.e., the other of the pair of elastic gripping portions 138A, 138B, is arranged circumferentially adjacent to the first elastic gripping portion 138A, and is generally formed as a cantilevered portion extending anteriorly or reversely from the first elastic gripping portion 138A (specifically, in an oblique direction slightly leaning radially inwardly), which is capable of elastic and radial deflection with a supported point on its proximal end (or posterior end). The distal end of the second elastic gripping portion 138B is provided as a contact point when abutting on the outer circumferential surface of the glass tube 134. The imaginary line that connects the contact points provided on the three second elastic gripping portions 138B forms a circle concentric with the body 137. The diameter of the imaginary circle, when the second elastic gripping portions 138B are not forced into elastic deflection or are in a free state, is set to be smaller than the outer diameter of the glass tube 134.

On the body 137, a pair of protector portions are formed as cantilevered portions protruding anteriorly from the anterior end edge thereof. The pair of protector portions are arranged circumferentially spaced apart, and extend linearly from the body 137 so as to be flush therewith. The conductive portion 140 is provided as a cantilevered portion that extends anteriorly from between the pair of protector portions. The conductive portion 140 includes a long portion 141 continuous with the anterior end of the body 137, and a cylindrical portion 142 that further projects anteriorly from the anterior end (or distal end) of the long portion 141.

The long portion 141 includes a proximal portion 141a that extends from the body 137 so as to be flush with the body 137 and parallel to the axis thereof, and further includes an intermediate portion 141b that extends radially inwardly from the distal end of the proximal portion 141a toward the axis of the body 137. Further included is a distal portion 141c that extends from the distal end of the intermediate portion 141b and parallel or substantially parallel to the axis of the body 137. The cylindrical portion 142 is connected to the distal end of the distal portion 141c. The width of the long portion 141 is set to be sufficiently small for the length of the long portion 141. Therefore, the long portion 141 is capable of elastic deformation in the radial direction of the body 137, elastic deformation in a direction intersecting with the radial direction (and intersecting with the longitudinal direction of the long portion 141), and elastic torsional deformation around the long portion 141 itself as the axis.

The cylindrical portion 142, which can be formed by bending a portion laterally extending from the distal end of the long portion 141 into a cylindrical shape, is arranged substantially coaxially with the body 137. The cylindrical portion 142 is capable of displacement around the axis of the ferrule 136 and radial displacement, due to elastic deflection of the long portion 141.

Attachment of Ferrule 136 to Glass Tube 134

Next, an assembling process for attaching a ferrule 136 to a glass tube 134 will be explained.

During the assembling process, while a ferrule 136 and a glass tube 134 are held by respective holding devices (not shown), the ferrule 136 and the glass tube 134 are moved relatively and coaxially so as to approach each other. Thereby, the body 137 is fitted onto the glass tube 134. When the body 137 begins engagement, the contact points provided on the distal end portions of the three pairs of elastic gripping portions 138A, 138B have elastic contact with the outer circumference of the glass tube 134. The contact points slide on the outer circumferential surface of the glass tube 134, as the assembling process proceeds. Then, the tip of the outer lead 135 having passed through the body 137 begins to enter the hollow of the cylindrical portion 142. When both of the holding devices have thereafter reached predetermined final positions, the ferrule 136 and the glass tube 134 are axially positioned in proper positions, resulting in the tip end portion of the outer lead 135 circumferentially surrounded by the cylindrical portion 142. At the time, the tip end portion of the outer lead 135 will not greatly protrude from the anterior end of the cylindrical portion 142. That is, it slightly protrudes out of the cylindrical portion 142, or is aligned with the anterior end of the cylindrical portion 142, or alternatively it is located within the cylindrical portion 142.

Thereafter, the cylindrical portion 142 is clamped so as to deform with diameter reduction. After being clamped, the cylindrical portion 142 is electrically conductively fixed to the outer lead 135 by welding, and consequently the ferrule 136 is integrated with the glass tube 134. Then, the assembling process terminates, and the discharge tube 115 is completed.

When the ferrule 136 is attached to the glass tube 134, the body 137 is concentrically held on the glass tube 134 due to the elastic holding function of the three pairs of elastic gripping portions 138A, 138B. A gap (airspace) is secured between the outer circumference of the glass tube 134 and the inner circumference of the body 137, so as to extend over the substantially entire circumference.

Figure 29:
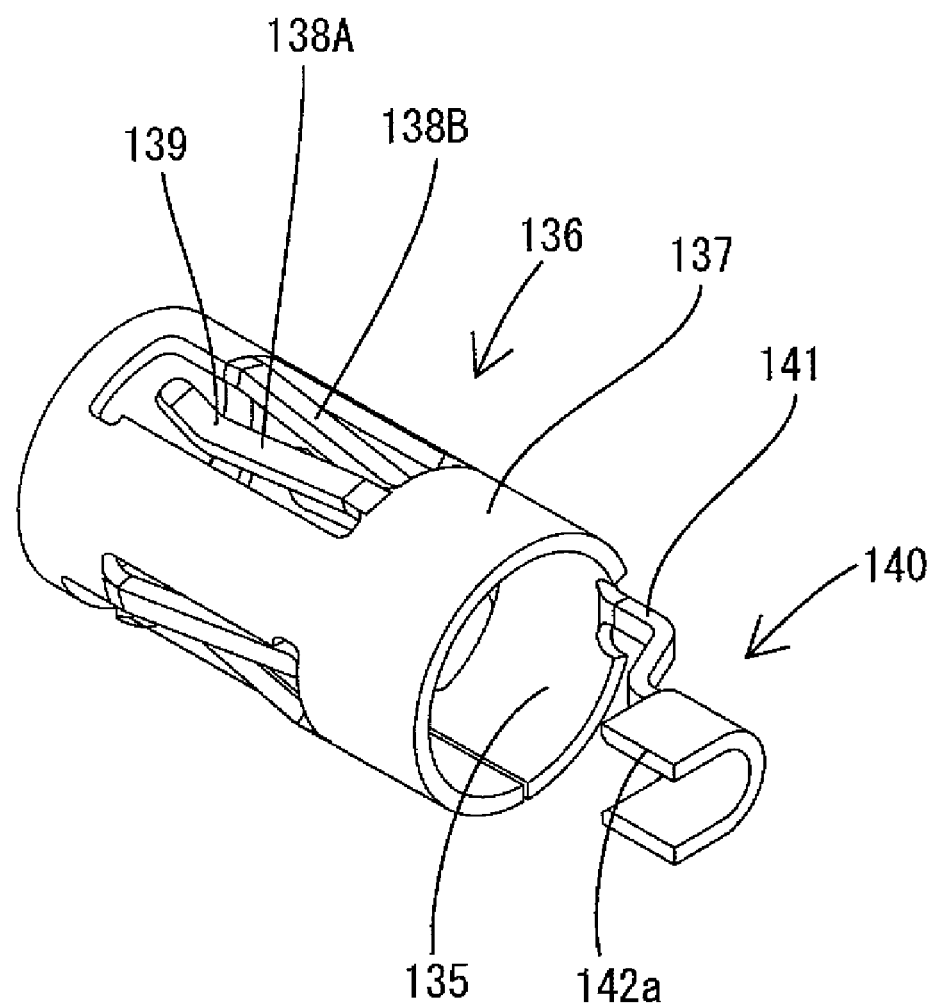
FIG. 29 is a perspective view showing a modification of a ferrule.
Figure 30:
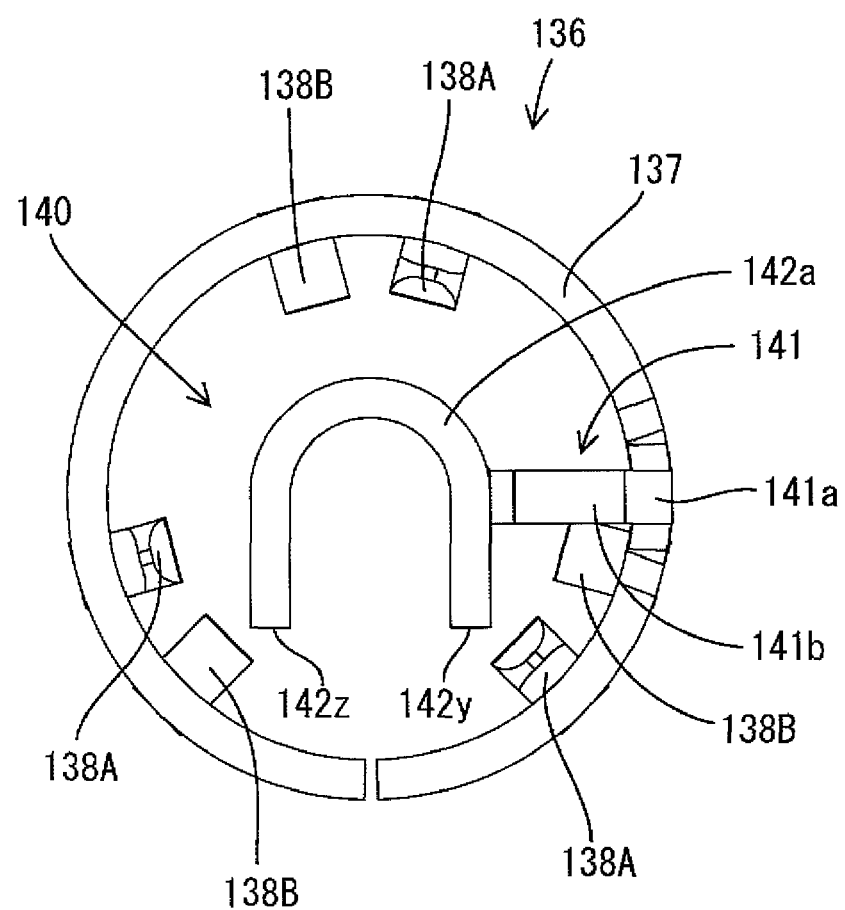
FIG. 30 is a side view of FIG. 29.

Instead of the cylindrical portion 142, a U-shaped connecting portion 142a may be provided as shown in FIGS. 29 and 30. In this case, after a glass tube 134 is fitted into a ferrule 136, the U-shaped connecting portion 142a is bended so as to hug the outer lead 135, in order to achieve electrical connection between the outer lead 135 and the connecting portion 142a. According to the present preferred embodiment thus including the bendable U-shaped connecting portion 142a, electrical connectivity with the outer lead 135 can be further improved.

Mounting of Discharge Tube 115 to Relay Connectors 114

The discharge tube 115, thus assembled, is fixed to relay connectors 114. At the time of fixation, the discharge tube 115 held in a horizontal position is moved toward the front surface of the chassis 113, and the end portions and the ferrules 136 of the glass tube 134 are fitted into the container rooms 123 of the relay connectors 114 from the front side. At the time, the pair of elastic pressing portions 132 are pushed by the body 137 of the ferrule 136 so as to open vertically due to elastic deflection. After the body 137 has passed through the shortest-distance portions of the pair of elastic pressing portions 132, the body 137 is pulled deep into the container room 123 due to elastic restoring forces of the elastic pressing portions 132, resulting in the body 137 abutting on the bottom of the container room 123. Then, the mounting of the discharge tube 115 is completed.

The discharge tube 115 thus mounted is held by the pairs of elastic pressing portions 132 at its end portions, and consequently is fixed to the chassis 113 via the relay terminals 131 and the holders 120 provided as the relay terminal 131 mounting bases. At the time, the weight of the discharge tube 115 is received solely by the chassis 113 via the relay connectors 114. That is, the outer leads 135 will not be under load due to the weight of the discharge tube 115.

The pair of elastic pressing portions 132 can have elastic contact with the outer circumferential surface of the body 137, and thereby the outer lead 135 is electrically conductively connected to the relay terminal 131 via the ferrule 136. Further, the glass tube 134 is held due to elastic restoring forces of the pair of elastic pressing portions 132, so as to be pressed against the concave portion 127 of the stopper 126. Therefore, when viewed along the axial direction of the discharge tube 115, the body 137 appears to be positioned so as to partially overlap with the stopper 126. That is, the end edge of the body 137 on the opposite side of the conductive portion 140 is axially positioned in proximity to the stopper 126 so as to be partially faced therewith.

The extended portion 129 is provided on the outer surface of the holder 120, which is perpendicular or substantially perpendicular to the surface of the chassis 113 and includes the escape opening 125 of the container room 123, so as to protrude from between the chassis 113 and the escape opening 125 and extend along the surface of the chassis 113. This results in a long creepage distance from the inside of the container room 123 to the front surface of the chassis 113.

Thereby, a leak, from the discharge tube 115 held in the container room 123 to the chassis 113 outside the holder 120, can be prevented.

Overview of Power Board 116

As shown in FIG. 21, each power board 116 includes a circuit board 117 having a circuit disposed on its back surface (i.e., the surface on the opposite side of the chassis 113), electronic components 119 mounted on the back surface of the circuit board 117, and a plurality of on-board connectors 118 mounted on the back surface of the circuit board 117.

The circuit board 117 preferably has a substantially vertically-elongated rectangular shape as a whole, and is formed using a phenolic paper-base copper-clad laminated board (known as a phenolic paper). A plurality of fitting holes 117H having a vertically-elongated rectangular shape are formed through the circuit board 117 so as to extend from the front side to the back side. The plurality of fitting holes 117H are arranged vertically along the lateral side edge of the circuit board 117 so as to correspond to the above-described relay terminals 131 (or relay connectors 114). Each on-board connector 118 includes a housing made of synthetic resin, and an output terminal (not shown) that is completely contained in the housing and made of metal (e.g., nickel silver). The on-board connectors 118 are arranged along the lateral side edge of the circuit board 117 so as to correspond to the respective fitting holes 117H. A fitting space (not shown) is formed on the outer surface of the housing so as to correspond to the fitting hole 117H, and the output terminal is partly exposed to the fitting space.

While the circuit board 117 is kept parallel to the chassis 113, the power board 116 is moved toward the chassis 113 from the back side and is fixed thereto. At the time of fixation, the wall portions 122 of the relay connectors 114 and the board connecting portions 133 arranged along the wall portions 122 penetrate the circuit board 117 through the fitting holes 117H and are inserted into the fitting spaces of the on-board connectors 118. Thereby, the on-board connectors 118 are fitted onto the relay connectors 114, and the output terminals are conductively connected to the relay terminals 131.

Operational Effects of Preferred Embodiment 2

In preferred embodiment 2, when a discharge tube 115 is supported on relay connectors 114, the stoppers 126 lock the ferrules 136. Therefore, the discharge tube 115 is secure from axial movement relative to the relay connectors 114. That is, if a force is applied to the discharge tube 115 so as to cause movement to the right, the stopper 126 catches the left-adjacent ferrule 136 attached on the left end portion of the discharge tube 115 so that the movement of the discharge tube 115 to the right is restricted. If a force is applied to the discharge tube 115 so as to cause movement to the left, the stopper 126 catches the right-adjacent ferrule 136 attached on the right end portion of the discharge tube 115 so that the movement of the discharge tube 115 to the left is restricted. Thus, the axial movement of the discharge tube 115 to either right or left is restricted, and therefore the tip of the outer lead 135 is reliably prevented from hitting the wall of the container room 123 on the opposite side of the escape opening 125.

The stopper 126 can engage with and lock the end edge of the ferrule 136, and therefore a hole that can engage with the stopper 126 is not required to be formed on the outer circumference of the ferrule 136. Thereby, processing cost can be reduced, and reduction in strength of the ferrule 136 can be prevented.

In the case of a construction in which a stopper 126 can engage with the end edge of a ferrule 136 on the side of the conductive portion 140, the conductive portion 140 extending from the end edge of the ferrule 136 may preclude the end edge of the ferrule 136 from engaging with the stopper 126, when the ferrule 136 is attached at some angle about its axis. However, in the present preferred embodiment 2, the stopper 126 is arranged to engage with the end edge on the opposite side of the conductive portion 140. Therefore, the conductive portion 140 will not preclude the ferrule 136 from engaging with the stopper 126, and consequently the ferrule 136 can infallibly engage with the stopper 126.

The conductive portion 140 includes a cylindrical portion 142, which can be circumferentially connected to the outer lead 135 so as to surround it. Thereby, the conductive portion 140 can be prevented from disengaging from the outer lead 135. That is, the cylindrical portion 142 will not disengage from the outer lead 135 when the cylindrical portion 142 is clamped. Therefore, the conductive portion 140 can be infallibly connected to the outer lead 135.

The margin for engagement of a ferrule 136 with a stopper 126 corresponds to half of the dimensional difference between the outer diameters of the glass tube 134 and the ferrule 136. In preferred embodiment 2, ferrules 136 are concentrically held on a glass tube 134 due to the elastic gripping portions 138A, 138B. Therefore, if the ferrule 136 is set to be large, a large dimensional difference can be secured between the inner diameter thereof and the outer diameter of the glass tube 134. Thereby, the margin for engagement of the ferrule 136 with the stopper 126 can be increased, resulting in reliable restriction of movement of the discharge tube 115.

The concave portion 127 is formed on a stopper 126, so as to abut on the outer circumference of a glass tube 134 when the ferrule 136 engages with the stopper 126. Further, the pair of elastic pressing portions 132 capable of pressing the discharge tube 115 toward the concave portion 127 side are provided in the relay connector 114. Specifically, the pair of elastic pressing portions 132 press the discharge tube 115 toward the concave portion 127 side, obliquely from above and obliquely from below, i.e., vertically symmetrically. Thereby, the glass tube 134 is prevented from disengaging from the concave portion 127, and therefore the engagement of the ferrule 136 with the stopper 126 can be reliably maintained.

The relay connector 114 is formed by mounting a relay terminal 131 in a holder 120 made of synthetic resin. In the present preferred embodiment 2, the stopper 126 is formed on the synthetic-resin holder 120. Therefore, a stopper is not required to be formed on the relay terminal 131, and thereby the material for manufacturing the relay terminals 131 can be reduced. Considering that the material cost for synthetic resin is generally lower than that for metal, the material cost for relay connectors 114 can be reduced according to preferred embodiment 2.

Preferred Embodiment 3

Next, preferred embodiment 3 of the present invention will be explained with reference to FIGS. 22 to 28. In the present preferred embodiment 3, the constructions for supporting a discharge tube 115 differ from those of preferred embodiment 2. The other constructions are similar to preferred embodiment 2. Therefore, the same constructions are designated by the same symbols, and explanations for the constructions, operations and effects thereof are omitted.

Overview of Grounding Member 150

Figure 22:
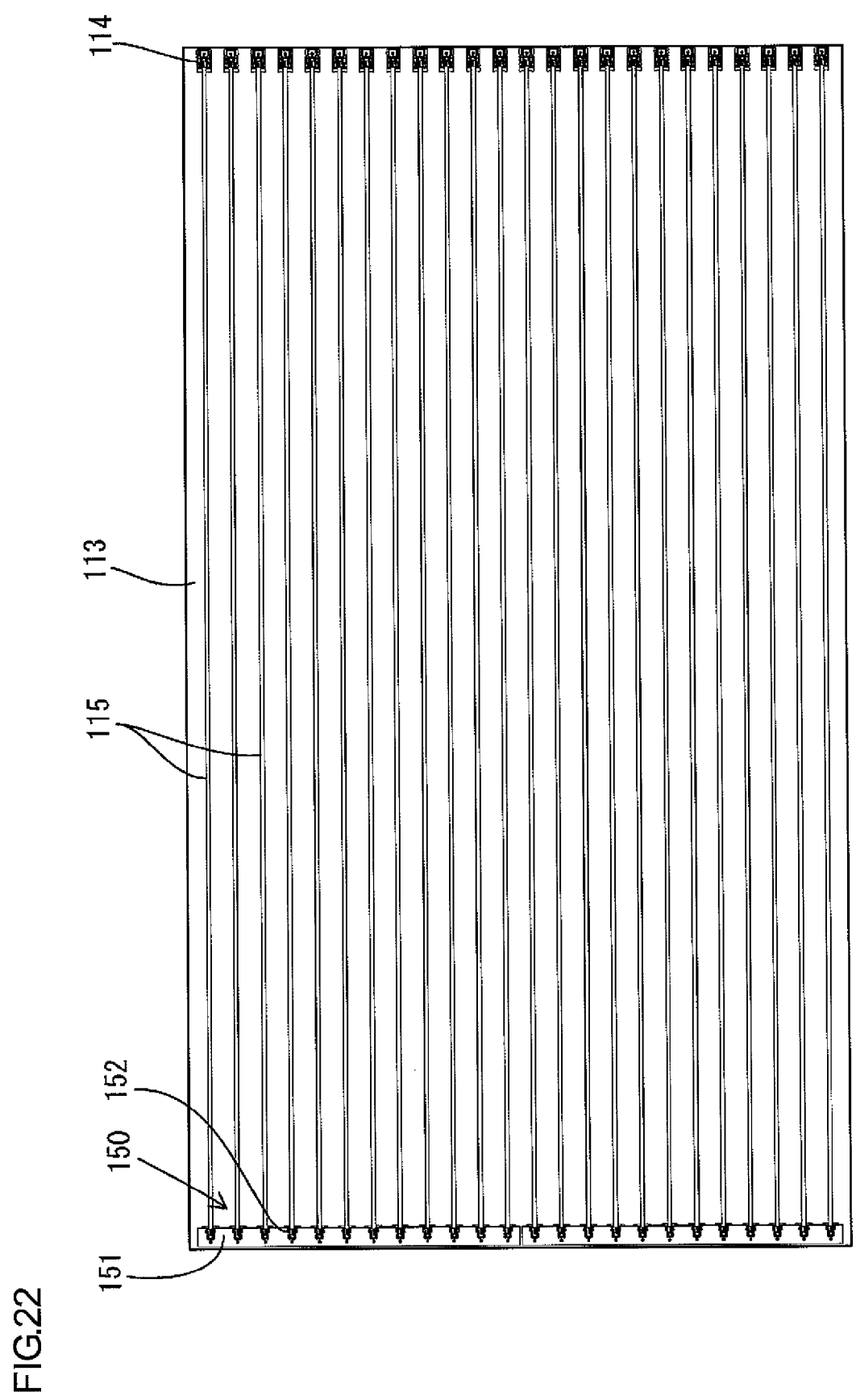
FIG. 22 is a front view of a lighting device according to preferred embodiment 3 of the present invention.
Figure 23:
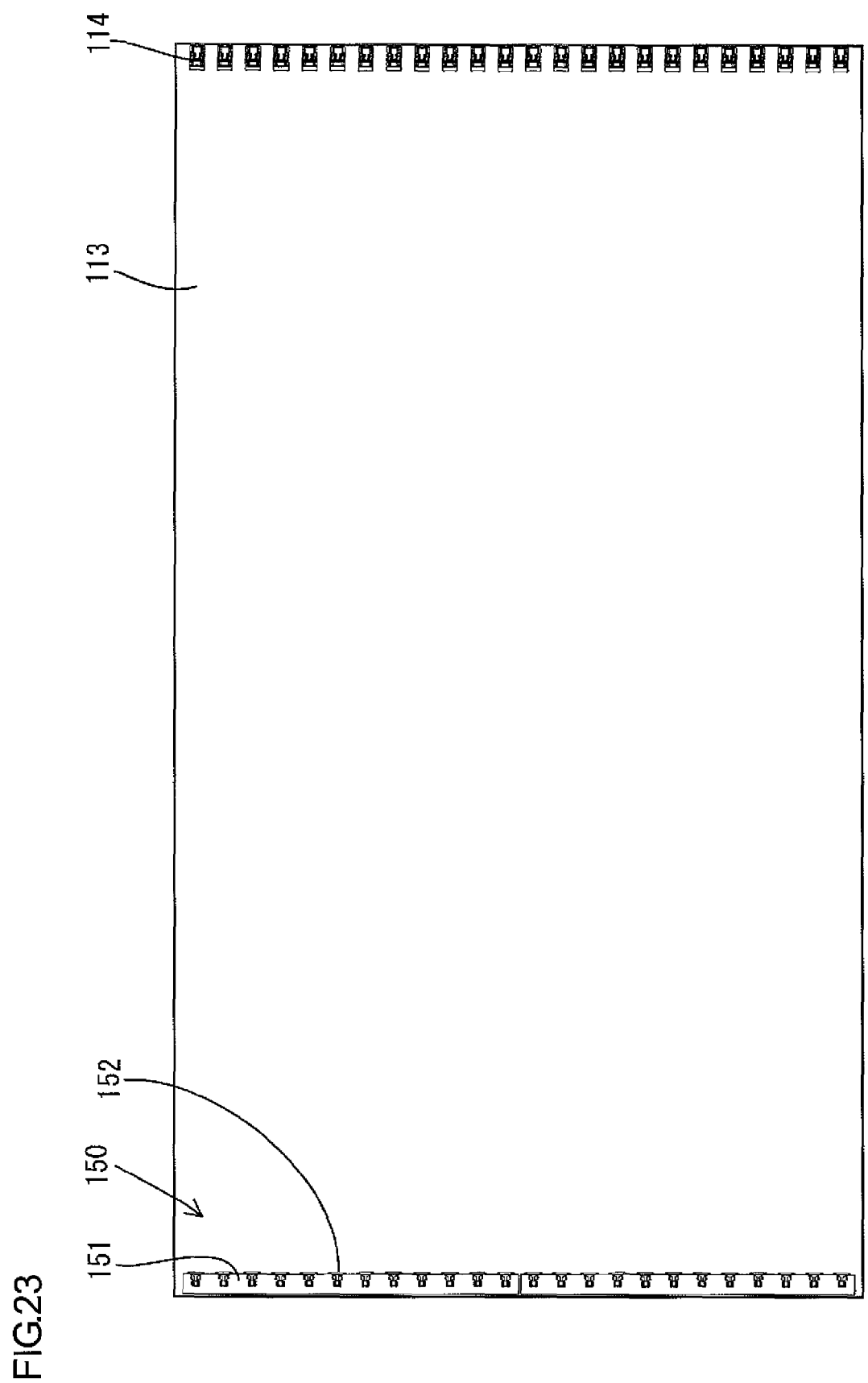
FIG. 23 is a front view showing the lighting device, from which discharge tubes are detached.
Figure 24:
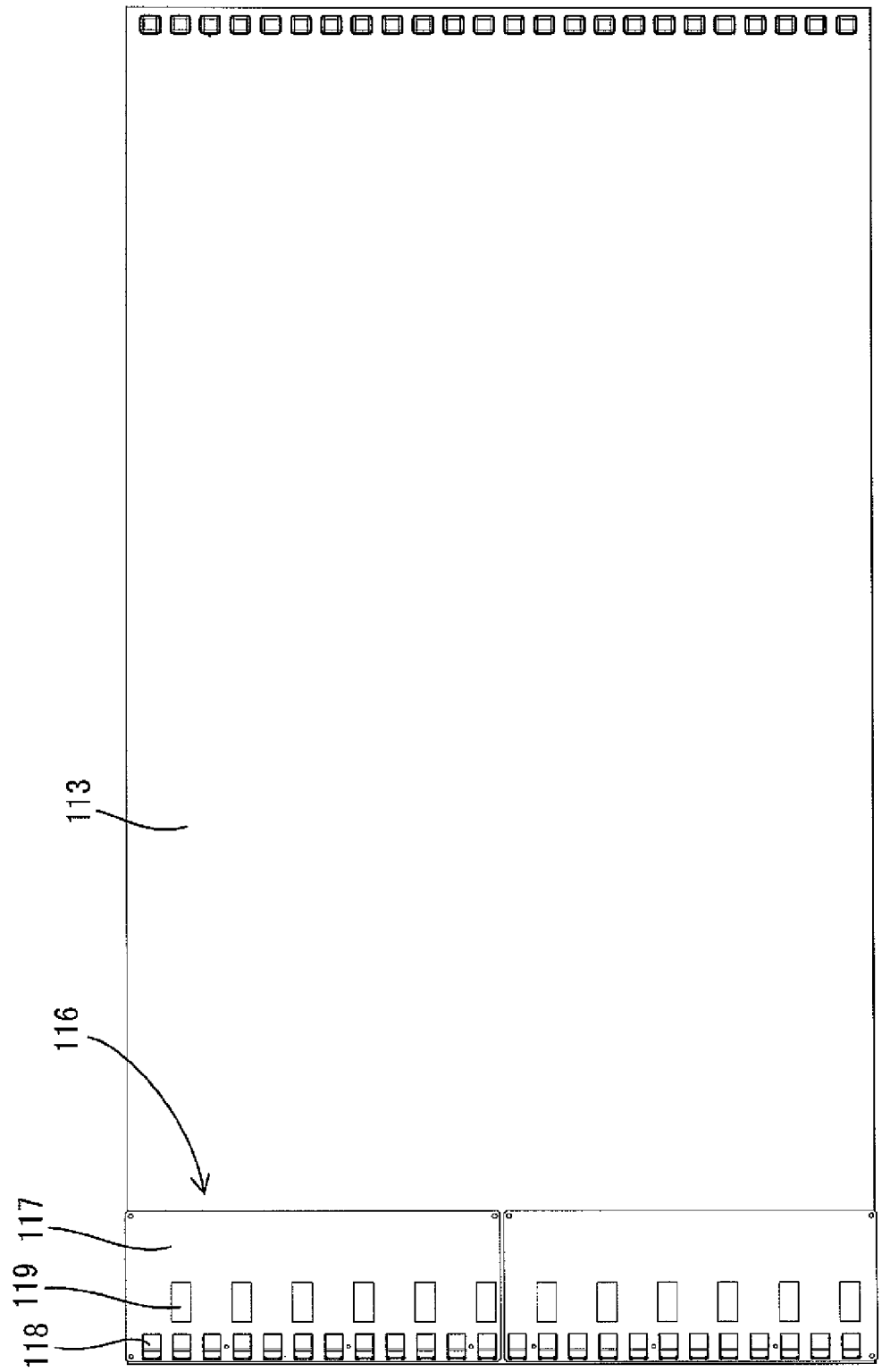
FIG. 24 is a rear view of the lighting device.

In preferred embodiment 2, the end portions of a discharge tube 115 are supported by relay connectors 114, each of which includes a holder 120 and a relay terminal 131. In the present preferred embodiment 3, as shown in FIGS. 22 and 23, one of the end portions of a discharge tube 115 is supported by the same relay connector 114 as preferred embodiment 2, while the other end portion of the discharge tube 115 is supported by a grounding member 150.

Figure 25:
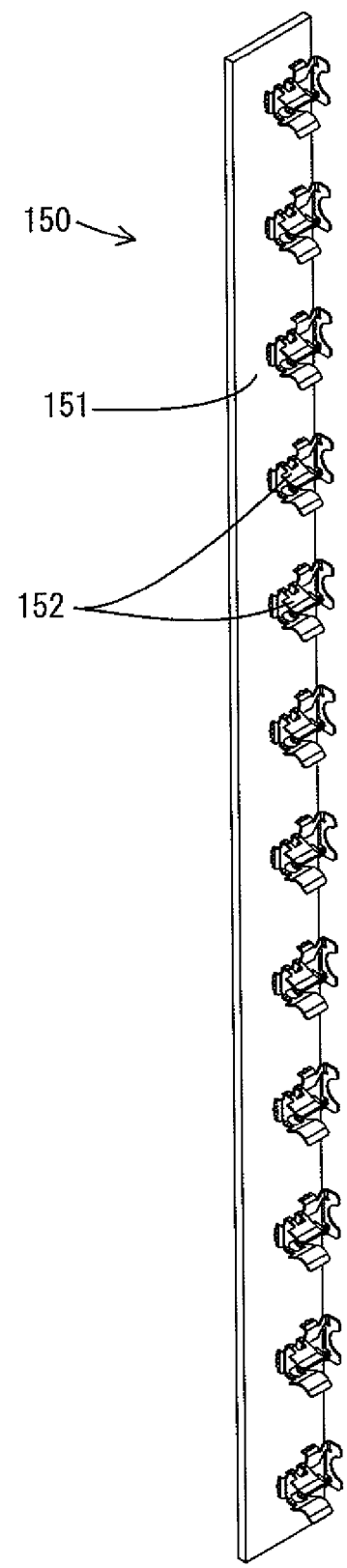
FIG. 25 is a perspective view of a grounding member.

As shown in FIG. 25, the grounding member 150 includes an elongated support plate 151 fixed to the chassis 113 so as to be along one of the lateral edge portions thereof, and further includes a plurality of grounding terminals 152 conductively mounted on the front surface of the support plate 151. Mounting holes 151H are formed through the support plate 151 so as to correspond three-to-one with the grounding terminals 152. The support plate 151 is formed of a substrate or a metallic plate.

Figure 26:
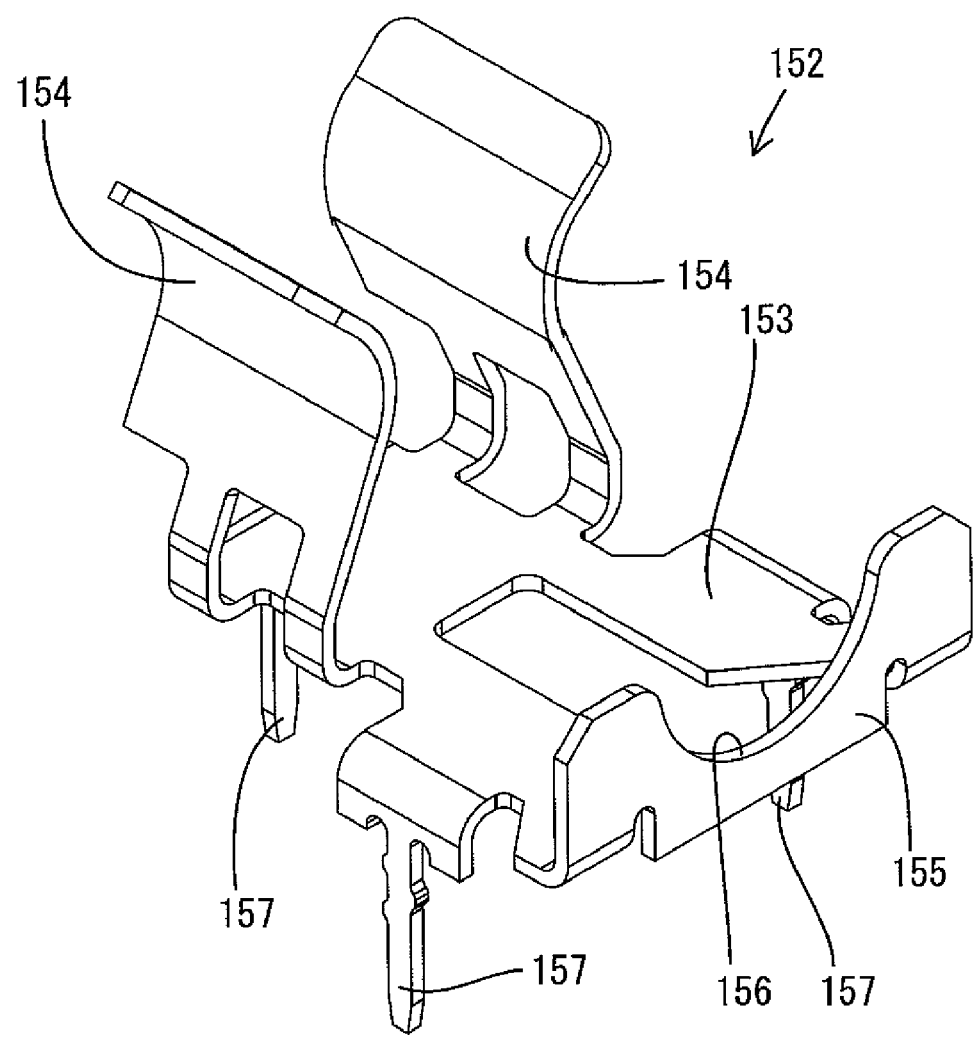
FIG. 26 is a perspective view of a grounding terminal.
Figure 27:
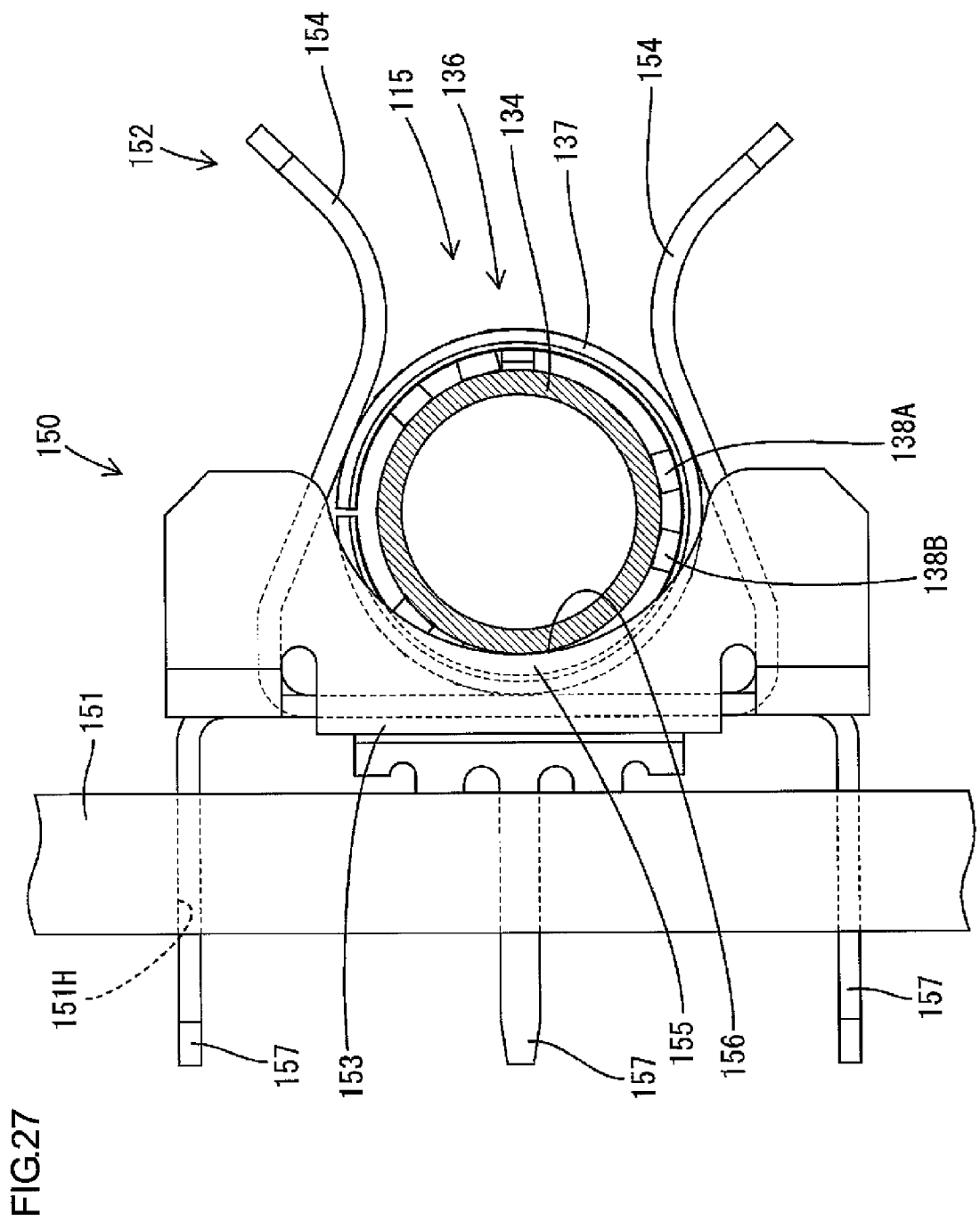
FIG. 27 is a sectional view showing that a ferrule on a discharge tube is capable of engaging with a stopper.

On the other hand, as shown in FIGS. 26 and 27, each grounding terminal 152, which can be formed by bending a metallic (e.g., nickel silver) plate that is formed into a predetermined shape by punching, includes a base portion 153 and a pair of elastic pressing portions 154 which extend vertically symmetrically from the respective upper and lower edge portions of the base portion 153 to the front side. Further included is a stopper 155 that extends from one of the lateral edge portions of the base portion 153 to the front side.

The pair of elastic pressing portions 154 are provided on the lateral edge portion on the opposite side of the stopper 155, so as to form bulging curves toward each other. The elastic pressing portions 154 are capable of elastic deflection so as to increase the distance therebetween. The minimum distance between the pair of elastic pressing portions 154, when the elastic pressing portions 154 are free from elastic deflection, is set to be smaller than the outer diameter of the glass tube 134 of a discharge tube 115.

The stopper 155 is raised from the base portion 153, so as to form a right angle with the axis of the discharge tube 115. A concave portion 156 is formed on the stopper 155, so as to sag in a substantially circular arc. On a relay connector 114 of the embodiment 2, a pair of guiding portions 128 protrude from the respective upper and lower sides of the concave portion 127 of the stopper 126. However, in preferred embodiment 3, the heights of portions protruding from the respective upper and lower sides of the concave portion 156 of the base portion 153 are reduced to be short. That is, structure or elements corresponding the guiding portions 128 of preferred embodiment 2 are not provided. Therefore, metallic material required for grounding terminals 152 can be reduced, compared to including guiding portions.

Three leg portions 157 are further formed on the base portion 153, so as to be integrated therewith. Two of the three leg portions 157 are provided between the elastic pressing portions 154 and the stopper 155, so as to project from the respective upper and lower edge portions of the base portion 153 to the opposite side of the elastic pressing portions 154 or the stopper 155 (i.e., to the back side). The remaining one of the leg portions 157 is provided on the lateral edge of the base portion 153 on the opposite side of the stopper 155, so as to project from the intermediate position between the elastic pressing portions 154 to the opposite side of the elastic pressing portions 154 or the stopper 155 (i.e., to the back side).

Figure 28:
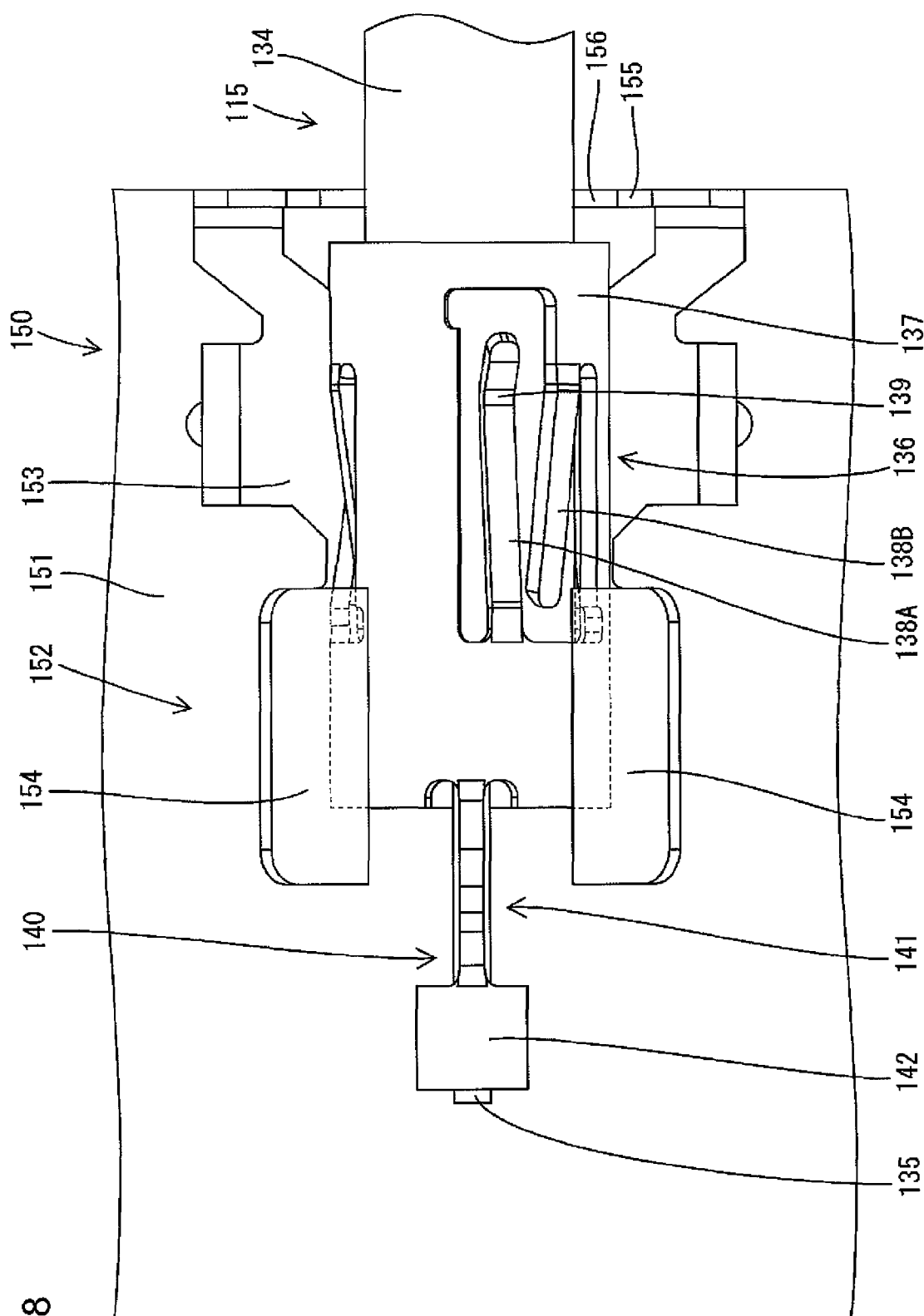
FIG. 28 is a partially-enlarged front view showing a connecting structure between a grounding terminal and a discharge tube.

The grounding terminal 152 is not housed in a member such as a plastic housing, i.e., barely provided, and is conductively fixed to the support plate 151 by soldering or the like so that its leg portions 157 penetrate through the mounting holes 151H (See FIG. 28). Thus, the plurality of grounding terminals 152 are mounted to the common support plate 151, and thereby are conductively connected to one another via the support plate 151. Power boards are not connected to the grounding members 150, and the support plate 151 is conductively connected to the chassis.

Mounting of Discharge Tube 115 to Grounding Terminal 152

When a discharge tube 115 is fixed to a grounding terminal 152, the discharge tube 115 held in a horizontal position is moved toward the front surface of the chassis 113, and the end portion and the ferrule 136 of the glass tube 134 are fitted between the pair of upper and lower elastic pressing portions 154 from the front side. At the time, the pair of elastic pressing portions 154 are pushed by the body 137 of the ferrule 136 so as to open vertically due to elastic deflection. After the body 137 has passed through the shortest-distance portions of the pair of elastic pressing portions 154, the body 137 is pulled toward the base portion 153 side due to elastic restoring forces of the elastic pressing portions 154, resulting in the body 137 abutting on the base portion 153. Then, the fixation of the discharge tube 115 is completed. The other end portion of the discharge tube 115 is fixed to a relay connector 114 in a similar manner to preferred embodiment 2.

The discharge tube 115 thus mounted is supported by the relay connector 114 and the grounding member 150 at its respective end portions. The pairs of elastic pressing portions 132, 154 can have elastic contact with the outer circumferential surfaces of the bodies 137 of the ferrules 136, and thereby the outer leads 135 are electrically conductively connected to the relay terminal 131 and the grounding terminal 152 via the ferrules 136. Further, the glass tube 134 is held due to elastic restoring forces of the pairs of elastic pressing portions 132, 154, so as to be pressed against the concave portions 127, 156 of the stoppers 126, 155. Therefore, when viewed along the axial direction of the discharge tube 115, the body 137 appears to be positioned so as to partially overlap with the stopper 126 or 155. That is, the end edge of the body 137 on the opposite side of the conductive portion 140 is axially positioned in proximity to the stopper 126 or 155 so as to be partially faced therewith.

Figure 31:
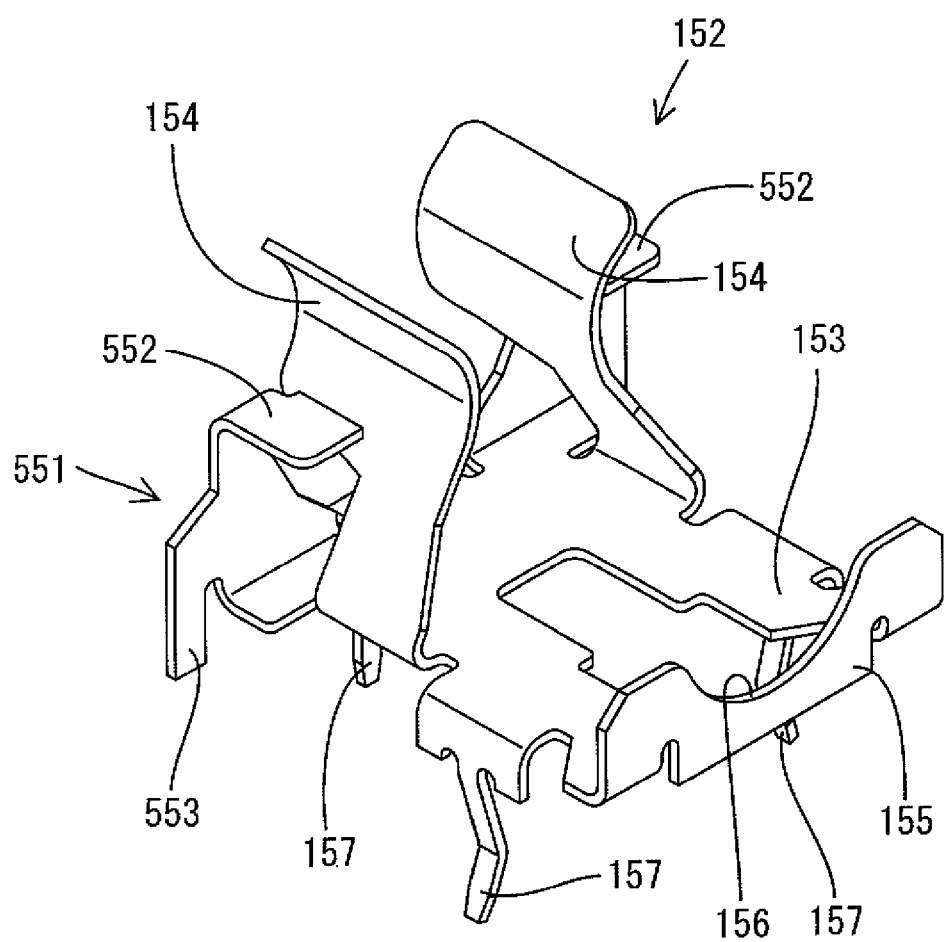
FIG. 31 is a perspective view of a grounding terminal.
Figure 32:
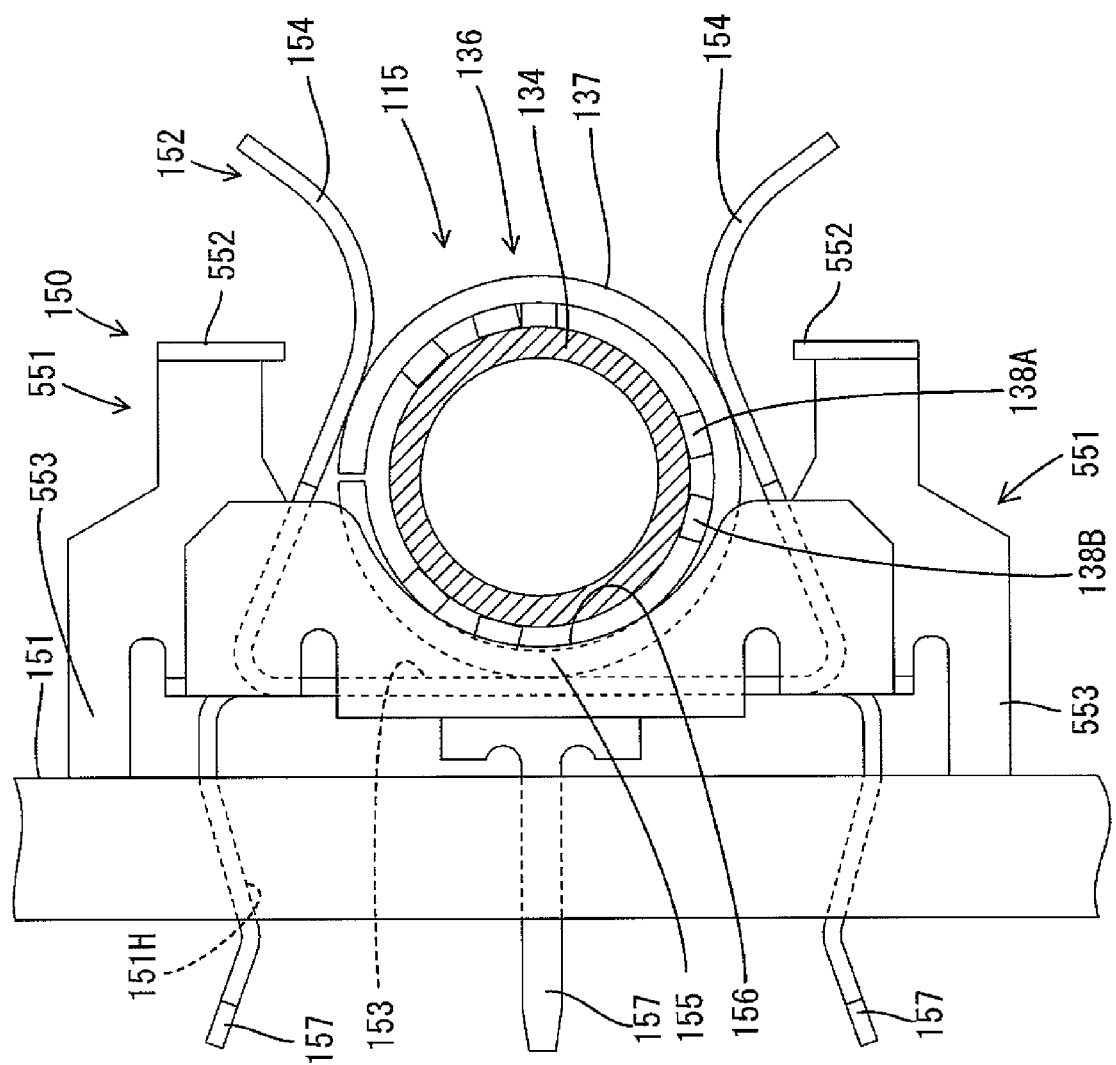
FIG. 32 is a sectional view showing a connection between a grounding terminal shown in FIG. 31 and a ferrule.

As shown in FIGS. 31 and 32, protector portions 551 may be provided on the grounding terminal 152. Each protector portion 551 includes a restricting portion 552 for an elastic pressing portion, and further includes an abutting portion 553 for abutting on the support plate. When the grounding terminal 152 is mounted and fixed to the support plate 151, the abutting portions 553 abut on or are located close to the support plate 151. If some kind of external force is applied to the elastic pressing portions 154 so that they are pushed to open, they first come in contact with the restricting portions 552 during the course of opening. The abutting portions 553 serve as supports for preventing the protector portions 551 from collapsing, when an additional load is thereafter applied. The protector portions 551 are connected to the feet of the elastic pressing portions 154, and therefore the abutting portions 553 should be arranged lateral to the connection portion in order that the abutting portions 553 work. Note that abutting portions 553 located at a longer distance from the connection portion are more effective.

Operational Effects of Preferred Embodiment 3

In preferred embodiment 3, when a discharge tube 115 is supported on a relay connector 114 and a grounding member 150, the stopper 126 of the holder 120 and the stopper 155 of the grounding terminal 152 lock the ferrules 136 on the respective ends of the discharge tube 115. Therefore, the discharge tube 115 is secure from axial movement relative to the relay connector 114.

That is, if a force is applied to the discharge tube 115 so as to cause movement from the relay connector 114 side to the grounding member 150 side, the ferrule 136 attached on the end portion of the discharge tube 115 on the relay connector 114 side is caught by the stopper 126 of the holder 120 so that the movement of the discharge tube 115 to the grounding member 150 side is restricted. If a force is applied to the discharge tube 115 so as to cause movement from the grounding member 150 side to the relay connector 114 side, the ferrule 136 attached on the end portion of the discharge tube 115 on the grounding member 150 side is caught by the stopper 155 of the grounding terminal 152 so that the movement of the discharge tube 115 to the relay connector 114 side is restricted. Thus, the axial movement of the discharge tube 115 to either right or left is restricted, and therefore the tip of the outer lead 135 is secure from hitting the wall of the container room 123 on the opposite side of the escape opening 125 or hitting the sidewall of the chassis 113.

The concave portion 156 is formed on the stopper 155 of a grounding terminal 152, so as to abut on the outer circumference of a glass tube 134 when the ferrule 136 is engaged with the stopper 155. Further, the pair of elastic pressing portions 154 capable of pressing the discharge tube 115 toward the concave portion 156 side are provided on the grounding terminal 152. Specifically, the pair of elastic pressing portions 154 press the discharge tube 115 toward the concave portion 156 side, obliquely from above and obliquely from below, i.e., vertically symmetrically. Thereby, the glass tube 134 is prevented from disengaging from the concave portion 156, and therefore the engagement of the ferrule 136 with the stopper 155 can be reliably maintained.

On the grounding member 150, the stoppers 155 are integrated with the respective grounding terminals 152 provided to achieve conductive connection to the ferrules 136. Thereby, the number of components can be reduced in preferred embodiment 3, compared to including stoppers provided as separate members from the grounding terminals.

Other Preferred Embodiments

The present invention is not limited to the preferred embodiments explained in the above description made with reference to the drawings. The following preferred embodiments may be included in the technical scope of the present invention, for example.

The mounting direction of the discharge tube to the relay connectors may differ from the mounting direction of the relay connectors to the connector portions. For example, the mounting direction of the discharge tube to the relay connectors may be substantially parallel to the surface of the chassis, while the mounting direction of the relay connectors to the connector portions is substantially perpendicular to the surface of the chassis. Conversely, the mounting direction of the relay connectors to the connector portions may be substantially parallel to the surface of the chassis, while the mounting direction of the discharge tube to the relay connectors is substantially perpendicular to the surface of the chassis.

The chassis when mounted to the lighting jig is not limited to being held in a horizontal position, but rather may be slanted at an acute angle to the horizontal plane or form a right angle with the horizontal plane.

In the above preferred embodiments, the lamp unit, in which the relay connectors and the discharge tubes are mounted to the chassis, is preferably assembled ahead of fixation to the lighting jig, and is fixed to the lighting jig. However, the construction to be fixed to the lighting jig is not limited to the lamp unit. The chassis, to which the relay connectors are mounted but the discharge tubes are not mounted, may be fixed to the lighting jig, so that the discharge tubes are thereafter mounted.

The connecting portion provided on the relay connector for connection to the power board is not limited to being formed as a protrusion, but rather may be formed as a recess. In this case, the connecting portions provided on the power board for connection to the relay connectors, and the connecting portion provided on the connector portion for connection to the relay connector should be formed as protrusions.

The discharge tube is not limited to a cold cathode fluorescent tube. A hot cathode fluorescent tube, a xenon tube or the like may be used instead.

The display panel of the display device is not limited to having TFTs as switching elements, but rather may include, as switching elements, elements other than TFTs such as MIM (Metal Insulator Metal) elements.

The display device is not limited to a liquid crystal display device. Various display devices requiring a lighting device on the back side of a display panel can be included.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight module to be connected to a power board in order to form a lighting device that is used in a display device for illuminating a display panel from a back side, said backlight module comprising:
   a chassis having a substantially plate-shaped configuration;
   a relay connector mounted to said chassis and arranged to be connected to said power board, said relay connector including a holder with a projecting portion that is arranged to penetrate through said chassis to be exposed at the back side of said chassis and a relay terminal housed in said holder;
   a discharge tube arranged on a front side of said chassis and connected to said relay connector; and
   an optical member mounted to said chassis from the front side so as to cover said discharge tube; wherein
   said relay terminal includes a connecting portion arranged in said holder along a wall portion of said projecting portion to be conductively engaged with a connector portion of a lighting jig that includes a power supply source and said connector portion of the lighting jig is connected to said power supply source.

2. A backlight module according to claim 1, wherein each of a mounting direction of said discharge tube to said relay connector and a mounting direction of said power board to said relay connector is substantially perpendicular to a surface of said chassis.

3. A backlight module manufacturing method for a backlight module to be connected to a power board in order to form a lighting device that is used in a display device for illuminating a display panel from a back side, said backlight module including:
   a chassis having a substantially plate-shaped configuration;
   a relay connector including a holder with a projecting portion and a relay terminal housed in said holder, the relay connector further including a connecting portion arranged in said holder along a wall portion of said projecting portion of said holder;

a discharge tube; and an optical member;

said backlight module manufacturing method comprising:

connecting said relay connector to said discharge tube;

arranging said discharge tube with said relay connector on a front side of said chassis;

mounting said relay connector to said chassis such that said projecting portion of said holder penetrates through said chassis to be exposed at a back side of said chassis engaging a portion of said projecting portion that is exposed to the back side of said chassis, with a connector portion of a lighting jig so as to light said discharge tube connected to said relay connector, said lighting jig including a power supply source and said connector portion of said lighting jig is connected to said power supply source; and mounting said optical member to said chassis from the front side of said chassis to cover the discharge tube while said discharge tube is lighted.

4. A backlight module manufacturing method according to claim 3, wherein each of a mounting direction of said discharge tube to said relay connector and a mounting direction of said power board to said relay connector is substantially perpendicular to a surface of said chassis.

5. A lighting device for a display device, to be used in the display device for illuminating a display panel from a back side, said lighting device comprising:

a backlight module; and a power board connected to said backlight module; wherein said backlight module includes:

a chassis having a substantially plate-shaped configuration;

a relay connector mounted to said chassis and including a holder with a projecting portion that is arranged to penetrate through said chassis so as to be exposed at a back side of said chassis and a relay terminal housed in said holder, said relay terminal including a connecting portion arranged in said holder along a wall portion of said projecting portion of said holder and connected to said power board;

a discharge tube arranged on a front side of said chassis and connected to said relay connector; and an optical member mounted to said chassis from the front side so as to cover said discharge tube; wherein said connecting portion is configured to be conductively engageable with a connector portion of a lighting jig in place of said power board, said lighting jig including a power supply source and said connector portion of said lighting jig is connected to said power supply source.

6. A display device comprising:

a lighting device that includes a backlight module and a power board connected to said backlight module; and a display panel arranged on a front side of said lighting device; wherein said backlight module includes:

a chassis having a substantially plate-shaped configuration;

a relay connector mounted to said chassis and including a holder including a projecting portion that arranged to penetrate through said chassis so as to be exposed at a back side of said chassis and a relay terminal housed in said holder, said relay terminal including a connecting portion arranged in said holder along a wall portion of said projecting portion of said holder and connected to said power board;

a discharge tube arranged on a front side of said chassis and connected to said relay connector; and an optical member mounted to said chassis from the front side so as to cover said discharge tube; wherein said connecting portion is configured to be conductively engageable with a connector portion of a lighting jig in place of said power board, said lighting jig including a power supply source and said connector portion of said lighting jig is connected to said power supply source.

7. A television receiver comprising a display device that includes:

a lighting device that includes a backlight module and a power board connected to said backlight module; and a display panel arranged on a front side of said lighting device; wherein said backlight module includes:

a chassis having a substantially plate-shaped configuration;

a relay connector mounted to said chassis and including a holder with a projecting portion arranged to penetrate through said chassis so as to be exposed at a back side of said chassis and a relay terminal housed in said holder, said relay connector including a connecting portion arranged in said holder along a wall portion of said projecting portion of said holder and connected to said power board;

a discharge tube arranged on a front side of said chassis and connected to said relay connector; and an optical member mounted to said chassis from the front side so as to cover said discharge tube; wherein said connecting portion is configured to be conductively engageable with a connector portion of a lighting jig in place of said power board, said lighting jig including a power supply source and said connector portion of the lighting jig is connected to said power supply source.

8. A backlight module to be connected to a power board in order to form a lighting device that is used in a display device for illuminating a display panel from a back side, said backlight module comprising:

a chassis having a substantially plate-shaped configuration;

a relay connector mounted to said chassis and arranged to be connected to said power board, said relay connector including a holder with a projecting portion arranged to penetrate through said chassis so as to be exposed at the back side of said chassis and a relay terminal housed in said holder;

a discharge tube arranged on a front side of said chassis and connected to said relay connector; and an optical member mounted to said chassis from the front side so as to cover said discharge tube; wherein:

said relay terminal includes a connecting portion arranged in said holder along a wall portion of said projecting portion of said holder and to be conductively engaged with a connector portion of said power board; and said connecting portion is configured to be conductively engageable with a connector portion of a lighting jig instead of said power board, said lighting jig including a power supply source and said connector portion of the lighting jig is connected to said power supply source.

9. A backlight module according to claim 8, wherein each of a mounting direction of said discharge tube to said relay connector and a mounting direction of said power board to said relay connector is substantially perpendicular to a surface of said chassis.

* * * * *